(12) United States Patent
Cha et al.

(10) Patent No.: US 9,912,010 B2
(45) Date of Patent: *Mar. 6, 2018

(54) ELECTROLYTIC SOLUTION FOR LITHIUM BATTERY AND LITHIUM BATTERY USING THE SAME

(71) Applicant: SAMSUNG SDI CO., LTD., Yongin-si, Gyeonggi-do (KR)

(72) Inventors: Siyoung Cha, Yongin-si (KR); Myungheui Woo, Yongin-si (KR); Seonghun Jeong, Yongin-si (KR); Woocheol Shin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 100 days.

This patent is subject to a terminal disclaimer.

(21) Appl. No.: 14/788,414

(22) Filed: Jun. 30, 2015

(65) Prior Publication Data

US 2016/0211550 A1    Jul. 21, 2016

(30) Foreign Application Priority Data

Jan. 16, 2015   (KR) .................. 10-2015-0008252

(51) Int. Cl.
 *H01M 10/0567* (2010.01)
 *H01M 10/0525* (2010.01)
 *H01M 4/587* (2010.01)

(52) U.S. Cl.
 CPC ....... *H01M 10/0567* (2013.01); *H01M 4/587* (2013.01); *H01M 10/0525* (2013.01); *H01M 2300/0025* (2013.01)

(58) Field of Classification Search
 CPC ........... H01M 10/052; H01M 10/0567; H01M 10/0568; H01M 10/0569; H01M 10/0525
 See application file for complete search history.

(56) References Cited

U.S. PATENT DOCUMENTS

| | | | |
|---|---|---|---|
| 3,689,438 A | 9/1972 | Bourat et al. | |
| 4,064,167 A | 12/1977 | DuBois et al. | |
| 5,626,981 A | 5/1997 | Simon et al. | |
| 6,033,809 A | 3/2000 | Hamamoto et al. | |
| 6,291,107 B1 | 9/2001 | Shimizu | |
| 6,436,582 B1 | 8/2002 | Hamamoto et al. | |
| 6,506,516 B1 | 1/2003 | Wietelmann et al. | |
| 6,783,896 B2 | 8/2004 | Tsujioka et al. | |
| 7,163,768 B2 | 1/2007 | Utsugi et al. | |
| 9,263,766 B2 * | 2/2016 | Makhmut | H01M 4/587 |
| 2003/0180626 A1 * | 9/2003 | Shima | H01M 10/0525 429/326 |
| 2004/0029004 A1 | 2/2004 | Miyaki | |
| 2004/0043300 A1 | 3/2004 | Utsugi et al. | |
| 2006/0134527 A1 | 6/2006 | Amine et al. | |
| 2006/0199077 A1 * | 9/2006 | Iwanaga | H01M 4/131 429/231.3 |
| 2009/0197167 A1 | 8/2009 | Okschimke | |
| 2010/0248041 A1 | 9/2010 | Kikuchi | |
| 2011/0183218 A1 | 7/2011 | Odani et al. | |
| 2012/0220785 A1 | 8/2012 | Bouteiller | |
| 2012/0231325 A1 | 9/2012 | Yoon et al. | |
| 2012/0258357 A1 | 10/2012 | Kim | |
| 2012/0288769 A1 | 11/2012 | Kono et al. | |
| 2013/0017455 A1 | 1/2013 | Deguchi et al. | |
| 2013/0171514 A1 | 7/2013 | Mio et al. | |
| 2014/0272604 A1 | 9/2014 | Lim et al. | |
| 2015/0010811 A1 | 1/2015 | Egorov et al. | |
| 2015/0086861 A1 | 3/2015 | Makhmut et al. | |

(Continued)

FOREIGN PATENT DOCUMENTS

| | | |
|---|---|---|
| EP | 2500975 A1 | 9/2012 |
| JP | 07-282845 | 10/1995 |
| JP | 2007-258103 | 10/2007 |

(Continued)

OTHER PUBLICATIONS

Abstract and Machine English Translation of Korean Patent No. 10-0692733 B1, Mar. 12, 2007, 17 Pages.
EPO Search Report dated Feb. 5, 2015, for corresponding European Patent application 14177532.0, (7 pages).
Patent Abstracts of Japan, and English machine translation of Japanese Publication 07-282845 dated Oct. 27, 1995, (13 pages).
Patent Abstracts of Japan, and English machine translation of Japanese Publication 2007-258103 dated Oct. 4, 1997, (38 pages).
Goethals, E., et al., The Disultone of 2.2-Dihydroxymethyl-1.3-Propane Disulphonic Acid, Bull. Soc. Chim. Belg., 70, 1961, pp. 218-220.
Peled, E., The Electrochemical Behavior of Alkali and Alkaline Earth Metals in Nonaqueous Battery Systems—The Solid Electrolyte Interphase Model, Journal of Electrochemical Society, Electrochemical Science and Technology, 126, 1979, pp. 2047-2051.

(Continued)

*Primary Examiner* — Anca Eoff
(74) *Attorney, Agent, or Firm* — Lewis Roca Rothgerber Christie LLP

(57) ABSTRACT

An electrolytic solution for a lithium battery includes a lithium salt, an organic solvent; a disultone-based compound represented by Formula 1, and a non-polar unsaturated group-containing cyclic carbonate-based compound:

Formula 1

$$\underset{O}{\overset{O}{\underset{\|}{S}}}\underset{(A_1)_{n1}}{\overset{O-(A_2)_{n2}(A_3)_{n3}}{\bigtimes}}\underset{(A_4)_{n4}-O}{\overset{S}{\underset{\|}{O}}}$$

wherein, in Formula 1, $A_1$ to $A_4$ are each independently a substituted or unsubstituted $C_1$-$C_5$ alkylene group, a carbonyl group, or a sulfinyl; $n1$ to $n4$ are each independently an integer 1 to 3, and when $n1$ to $n4$ are each independently two or greater, a respective plurality of any of $A_1$s to $A_4$s are identical to or different from each other. When the lithium battery includes the electrolyte solution, room-temperature and high-temperature lifespan characteristics of the lithium battery may improve.

20 Claims, 9 Drawing Sheets

(56) References Cited

U.S. PATENT DOCUMENTS

2016/0211550 A1 7/2016 Cha et al.
2016/0268636 A1* 9/2016 Cha .................. H01M 10/0567

FOREIGN PATENT DOCUMENTS

| KR | 10-0538901 B1 | 12/2005 |
|---|---|---|
| KR | 10-0692733 B1 | 3/2007 |
| KR | 10-0716373 B1 | 5/2007 |
| KR | 10-2012-0103519 A | 9/2012 |
| KR | 10-2013-0002333 A | 1/2013 |
| KR | 10-2013-0043221 A | 4/2013 |
| KR | 10-2013-0142387 A | 12/2013 |
| KR | 10-2014-0104383 A | 8/2014 |

OTHER PUBLICATIONS

Xu, K., et al., Interfacing Electrolytes with Electrodes in Li Ion Batteries, Journal of Materials Chemistry, vol. 21, Feb. 7, 2011, pp. 9849-9864.
2,7-dioxa-3, 8-dithiaspiro [4.4] nonane 3, 3, 8, 8-tetraoxide-Compound summary, http://pubchem.ncbi.nlm.nih.gov/summary/summary.cgi?cid=248367.
U.S. Office Action dated Jun. 25, 2015, issued in cross-reference U.S. Appl. No. 14/151,750 (8 pages).
U.S. Notice of Allowance dated Oct. 6, 2015, issued in cross-reference U.S. Appl. No. 14/151,750 (5 pages).
U.S. Office Action dated Dec. 21, 2016, issued in cross-reference U.S. Appl. No. 15/068,054 (16 pages).
U.S. Office Action dated Dec. 22, 2016, issued in cross-reference U.S. Appl. No. 15/064,466 (13 pages).

* cited by examiner

ELECTROLYTIC SOLUTION FOR LITHIUM BATTERY AND LITHIUM BATTERY USING THE SAME

CROSS-REFERENCE TO RELATED APPLICATION

This application claims priority to and the benefit of Korean Patent Application No. 10-2015-0008252, filed on Jan. 16, 2015, in the Korean Intellectual Property Office, the entire content of which is incorporated herein by reference.

BACKGROUND

1. Field

One or more aspects of embodiments of the present invention relate to an electrolytic solution for a lithium battery and a lithium battery including the electrolytic solution.

2. Description of the Related Art

Lithium batteries are typically used as power sources for portable electronic devices such as camcorders, mobile phones, and laptop computers. Lithium secondary batteries are rechargeable at high rates and have energy density per unit of weight of about three times higher than that of lead storage batteries, nickel-cadmium (Ni—Cd) batteries, nickel-hydrogen batteries, and/or nickel-zinc batteries in related art.

A lithium battery operating at a high driving voltage is incompatible with an aqueous electrolytic solution that is highly reactive with lithium. For this reason, lithium batteries typically use an organic electrolytic solution. The organic electrolytic solution may be prepared by dissolving a lithium salt in an organic solvent. A suitable organic solvent may be stable at high voltages, may have a high ionic conductivity, a high dielectric constant, and a low viscosity.

For example, using a carbonate-based polar, non-aqueous solvent in a lithium battery may cause a side reaction between a negative electrode and/or a positive electrode and the electrolytic solution during initial charging, and consequentially may lead to an irreversible reaction using excess charges.

The irreversible reaction may result in a passivation layer (such as a solid electrolyte interface (SEI) layer) being formed on a surface of the negative electrode. The SEI layer may prevent or substantially reduce decomposition of the electrolyte and may also serve as an ion channel. The higher the stability of the SEI layer and the lower its resistance, the better the lifespan characteristics of the resulting lithium battery.

The irreversible reaction may also form a protection layer on a surface of the positive electrode. The protection layer may prevent or substantially reduce decomposition of the electrolytic solution during charging and discharging and may serve as an ion tunnel. The higher the stability of the protection layer at high temperature, the better the lifespan characteristics of the resulting lithium battery.

Therefore, there is a demand for an organic electrolytic solution capable of forming a stable SEI layer and/or protection layer, which may improve lifespan characteristics of a lithium battery.

SUMMARY

One or more aspects of embodiments of the present invention are directed to an electrolytic solution for a lithium battery that may improve lifespan characteristics of the lithium battery.

One or more aspects of embodiments of the present invention are directed to a lithium battery including the electrolytic solution.

Additional aspects will be set forth in part in the description which follows and, in part, will be apparent from the description, or may be learned by practice of the presented embodiments.

According to one or more embodiments of the present invention, an electrolytic solution for a lithium battery includes:

a lithium salt; an organic solvent; a disultone-based compound represented by Formula 1 below; and a non-polar unsaturated group-containing cyclic carbonate-based compound:

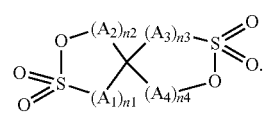

Formula 1

In Formula 1, $A_1$ to $A_4$ may be each independently selected from a substituted or unsubstituted $C_1$-$C_5$ alkylene group, a carbonyl group, and a sulfinyl group; n1 to n4 may be each independently an integer selected from 1 to 3; when the number of $A_1$ to $A_4$ are each independently two or greater, the plurality of $A_1$s to $A_4$s may be identical to or different from each other.

According to one or more embodiments of the present invention, a lithium battery includes:

a positive electrode; a negative electrode; and the electrolytic solution according to one or more embodiments of the present invention.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
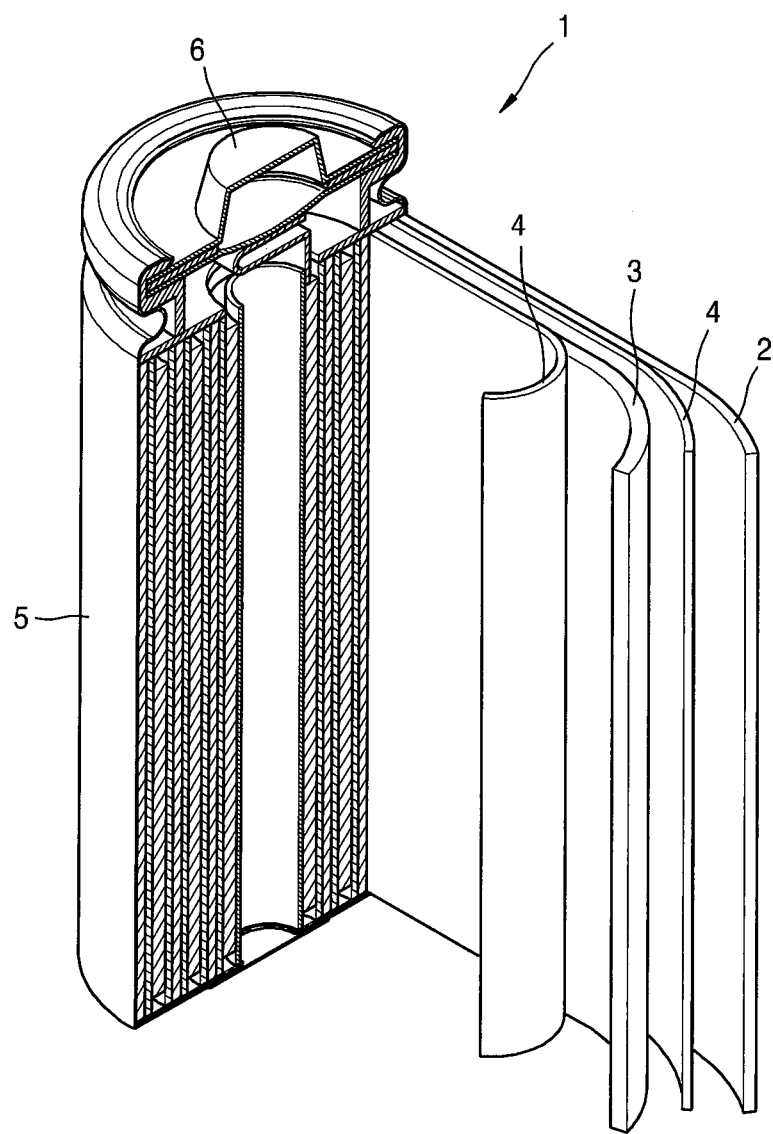
FIG. 1 is a schematic perspective view of a lithium battery according to one or more embodiments.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention."

In addition, as used herein, the terms "use," "using," and "used" may be considered synonymous with the terms "utilize," "utilizing," and "utilized," respectively. Also, the term "exemplary" is intended to refer to an example or illustration.

As used herein, the term "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, and 35 U.S.C. § 132(a).

Hereinafter, an electrolytic solution for a lithium battery and a lithium battery including the electrolytic solution according to one or more embodiments of the present invention will be described.

According to some embodiments, an electrolytic solution for a lithium battery includes a lithium salt; an organic solvent; a disultone-based compound represented by Formula 1; and a non-polar unsaturated group-containing cyclic carbonate-based compound:

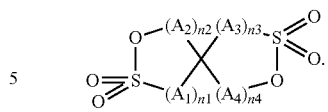

Formula 1

In Formula 1, $A_1$ to $A_4$ may be each independently selected from a substituted or unsubstituted $C_1$-$C_5$ alkylene group, a carbonyl group, and a sulfinyl group; and n1 to n4 may be each independently an integer selected from 1 to 3, wherein, when the numbers of $A_1$ to $A_4$ are each independently 2 or greater, a plurality of $A_1$s to $A_4$s may be identical to or different from each other.

Both the disultone-based compound and the non-polar unsaturated group-containing cyclic carbonate compound may be included in an electrolytic solution of a lithium battery and thus may improve battery performance characteristics including but not limited to lifespan characteristics of the lithium battery.

Without being bound by any particular theory, it is believed that the reason why performance of the lithium battery improves when the disultone-based compound and the non-polar unsaturated group-containing cyclic carbonate compound are both (simultaneously) included in the electrolytic solution are as follows.

A sulfonate ester group included in the disultone-based compound accepts electrons from a surface of a negative electrode during charging, and thus the sulfonate ester group may be reduced or may react with reduced polar solvent molecules to affect a property of a solid electrolyte interface (SEI) layer formed on the surface of the negative electrode. For example, the disultone-based compound including at least one sulfonate ester group may more easily accept electrons from the negative electrode than a polar solvent. That is, the disultone-based compound may be reduced at a voltage lower than that of the polar solvent and before the polar solvent is reduced.

In some embodiments, the disultone-based compound has a structure having two sultone rings that are connected in a spiro form and including at least one sulfonate ester group, and thus the disultone-based compound may be easily reduced and/or decomposed to radicals and/or ions during charging. These radicals and/or ions may combine with lithium ions, and thus may contribute to formation of the SEI layer on the negative electrode. For example, the radicals and/or ions dissociated from the disultone-based compound may form a covalent bond with various kinds (types) of functional groups on a surface of the carbonaceous negative electrode or with the carbonaceous negative electrode, or may be adsorbed on an electrode surface. Also, the disultone-based compound including at least one sulfonate ester group may be configured on a positive electrode surface, and thus may influence a property of a protection layer formed on the positive electrode surface. Furthermore, since the disultone-based compound of embodiments of the present invention has a plurality of rings that are linked in a spiro form, a molecular weight of the disultone-based compound may be relatively higher than that of a general sultone-based compound, and thus the disultone-based compound may have improved thermally stability.

In addition, when the non-polar unsaturated group-containing carbonate compound has a cyclic structure, it may be more easily reduced to radicals and/or ions during charging than a polar solvent. These radicals and/or ions may be polymerized and may contribute to the formation of the SEI layer on the negative electrode.

Accordingly, when the electrolytic solution simultaneously including the disultone-based compound and the non-polar unsaturated group-containing cyclic carbonate compound is used (utilized), the radicals and/or ions of the disultone-based compound and the radicals and/or ions of the non-polar unsaturated group-containing cyclic carbonate compound may be linked to each other or to lithium ions during initial charging, and thus the SEI layer may be formed on the negative electrode in a shorter period of time than when only one of the disultone-based compound and the non-polar unsaturated group-containing cyclic carbonate compound is used. The resulting SEI layer may be a modified SEI layer that is different from an SEI layer in which the disultone-based compound and the non-polar unsaturated group-containing cyclic carbonate compound are not included. The modified SEI layer may be a stable SEI layer and may maintain its firm state after charging and discharging for a longer period of time as compared to an SEI layer formed by using only an organic solvent or an SEI layer formed by using only one of the disultone-based compound and the non-polar unsaturated group-containing cyclic carbonate compound. In this regard, direct contact between the organic solvent and the negative electrode may be substantially blocked by the firm modified SEI layer.

In some embodiments, the sulfonate ester group and a carbonate group of the non-polar unsaturated group-containing cyclic carbonate compound (after its ring has been opened) are coordinated to a transition metal ion of a positive active material to form a complex. A protection layer formed by using such complex may be a modified protection layer that is different from a protection layer in which the disultone-based compound and the non-polar unsaturated group-containing cyclic carbonate compound are not included. The modified protection layer may be a stable protection layer that may maintain its firm state after charging and discharging for a longer period of time as compared to a protection layer formed by using only an organic solvent or a protection layer formed by using only one of the disultone-based compound and the non-polar unsaturated group-containing cyclic carbonate compound. In this regard, direct contact between the organic solvent and the positive electrode may be substantially blocked by the firm modified protection layer.

Accordingly, the disultone-based compound and the non-polar unsaturated group-containing cyclic carbonate compound may be linked to a compound of the same kind (type) and/or to each other to form the SEI layer on the negative electrode surface and/or the protection layer on the positive electrode surface, thus improving stability and lifespan characteristics of the lithium battery.

In the disultone-based compound represented by Formula 1, the alkylene group may be substituted with at least one selected from a deuterium; a halogen substituted or unsubstituted $C_1$-$C_{20}$ alkyl group; a halogen substituted or unsubstituted $C_5$-$C_{20}$ cycloalkyl group; a halogen substituted or unsubstituted $C_1$-$C_{20}$ alkoxy group; a halogen substituted or unsubstituted $C_2$-$C_{20}$ alkenyl group; a halogen substituted or unsubstituted $C_2$-$C_{20}$ alkynyl group; a halogen substituted or unsubstituted $C_3$-$C_{20}$ cycloalkenyl group; a halogen substituted or unsubstituted $C_3$-$C_{20}$ heterocycloalkyl group; a halogen substituted or unsubstituted $C_1$-$C_{20}$ heterocycloalkenyl group; a halogen substituted or unsubstituted $C_6$-$C_{40}$ aryl group; a halogen substituted or unsubstituted $C_3$-$C_{40}$ aryloxy group; a halogen substituted or unsubstituted $C_3$-$C_{40}$ arylthio group; a halogen substituted or unsubstituted $C_2$-$C_{40}$ heteroaryl group; and a polar functional group including a heteroatom in addition to any of the substituents above.

For example, the alkylene group may be substituted with at least one selected from a halogen substituted or unsubstituted $C_1$-$C_{10}$ alkyl group; a halogen substituted or unsubstituted $C_6$-$C_{20}$ aryl group; and a halogen substituted or unsubstituted $C_2$-$C_{20}$ heteroaryl group.

For example, the alkylene group may be substituted with at least one selected from a halogen atom, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrolyl group, and a pyridinyl group, but embodiments of the present invention are not limited thereto, and any suitable functional group available in the art as a substituent of an alkylene group may be used.

In some embodiments, in the disultone-based compound represented by Formula 1, the substituent of an alkylene group may be a polar functional group including a heteroatom, in addition to any of the substituents described above. The heteroatom of the polar fictional group may be at least one selected from oxygen, nitrogen, phosphorus, sulfur, silicon, and boron.

For example, the polar functional group including a heteroatom may include at least one selected from —F, —Cl, —Br, —I, a hydroxyl group, a cyano group, a thiocyano group, an isocyanato group, a nitro group, a nitroso group, an azide group, an amino group, an amidino group, a hydrazine group, a hydrazone group, —OC(=O)OR$^{16}$, —R$^{15}$OC(=O)OR$^{16}$, —C(=O)R$^{16}$, —R$^{15}$C(=O)R$^{16}$, —OC(=O)R$^{16}$, —R$^{15}$OC(=O)R$^{16}$, C(=O)—O—C(=O)R$^{16}$, —R$^{15}$C(=O)—O—C(=O)R$^{16}$, —SR$^{16}$, —R$^{15}$SR$^{16}$, —SSR$^{16}$, —R$^{15}$SSR$^{16}$, —S(=O)R$^{16}$, —R$^{15}$S(=O)R$^{16}$, —R$^{15}$C(=S)R$^{16}$, —R$^{15}$C(=S)SR$^{16}$, —NNC(=S)R$^{16}$, —R$^{15}$NNC(=S)R$^{16}$,

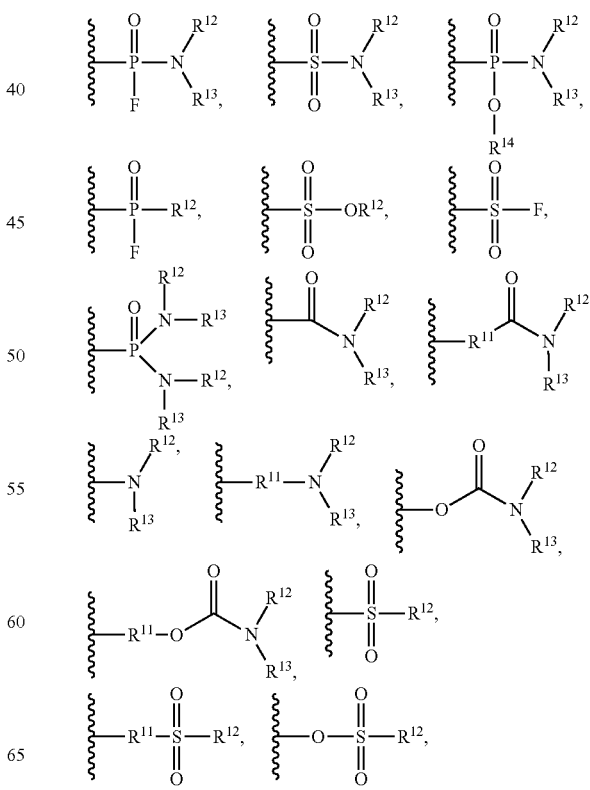

-continued

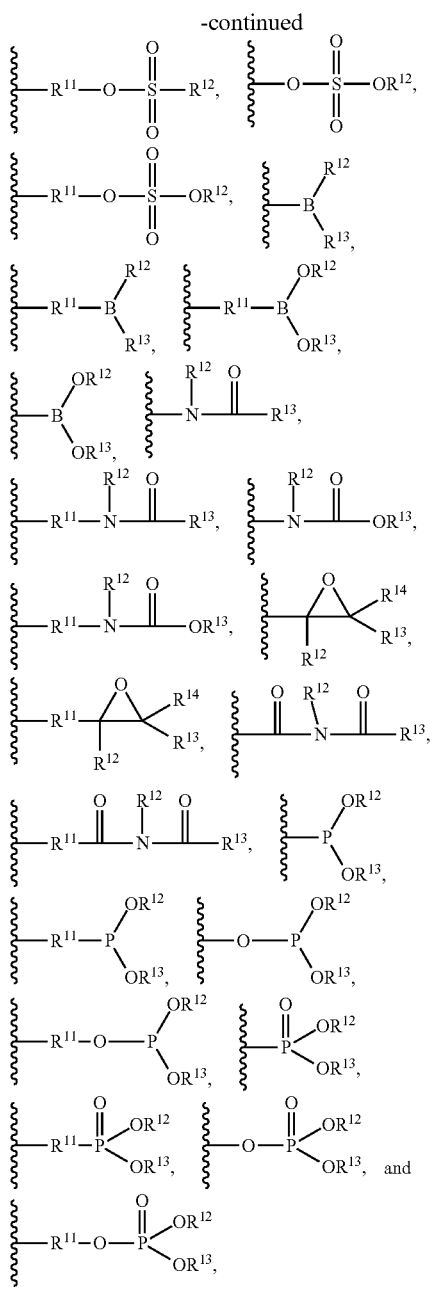

where $R^{11}$ and $R^{15}$ may be each independently selected from a halogen substituted or unsubstituted $C_1$-$C_{20}$ alkylene group; a halogen substituted or unsubstituted $C_2$-$C_{20}$ alkenylene group; a halogen substituted or unsubstituted $C_3$-$C_{20}$ cycloalkylene group; a halogen substituted or unsubstituted $C_3$-$C_{20}$ cycloalkenylene group; a halogen substituted or unsubstituted $C_1$-$C_{20}$ heterocycloalkenylene group; a halogen substituted or unsubstituted $C_6$-$C_{20}$ arylene group; and a halogen substituted or unsubstituted $C_1$-$C_{20}$ heteroarylene group, and $R^{12}$, $R^{13}$, $R^{14}$, and $R^{16}$ may be each independently selected from a hydrogen atom; a halogen atom; a halogen substituted or unsubstituted $C_1$-$C_{20}$ alkyl group; a halogen substituted or unsubstituted $C_2$-$C_{20}$ alkenyl group; a halogen substituted or unsubstituted $C_2$-$C_{20}$ alkynyl group; a halogen substituted or unsubstituted $C_2$-$C_{20}$ alkoxy group; a halogen substituted or unsubstituted $C_3$-$C_{20}$ cycloalkyl group; a halogen substituted or unsubstituted $C_1$-$C_{20}$ heterocycloalkyl group; a halogen substituted or unsubstituted $C_3$-$C_{20}$ cycloalkenyl group; a halogen substituted or unsubstituted $C_1$-$C_{20}$ heterocycloalkenyl group; a halogen substituted or unsubstituted $C_6$-$C_{20}$ aryl group; a halogen substituted or unsubstituted $C_6$-$C_{20}$ aryloxy group; a halogen substituted or unsubstituted $C_5$-$C_{20}$ arylthio group; a halogen substituted or unsubstituted $C_2$-$C_{40}$ heteroaryl group; and a halogen substituted or unsubstituted $C_7$-$C_{15}$ trialkylsilyl group.

For example, the halogen atom in the halogen substituted alkyl group, alkenyl group, alkynyl group, cycloalkyl group, aryl group, heteroaryl group, alkylaryl group, and/or trialkylsilyl group included in the polar fictional group including a heteroatom may be fluorine (F).

In some embodiments, $A_1$ to $A_4$ may be each independently a $C_1$-$C_5$ alkylene group, n1 and n3 may be each independently selected from 1 and 2, and n2 and n4 may be 1.

For example, the disultone-based compound may be represented by one of Formulae 2 and 3:

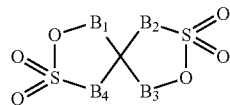

Formula 2

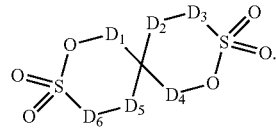

Formula 3

In Formulae 2 and 3, $B_1$ to $B_4$ and $D_1$ to $D_6$ may be each independently selected from —C($E_1$)($E_2$)-; a carbonyl group (—C(=O)—); and a sulfinyl group (—S(=O)—), where $E_1$ and $E_2$ may be each independently selected from a hydrogen atom; a halogen atom; a halogen substituted or unsubstituted $C_1$-$C_{20}$ alkyl group; a halogen substituted or unsubstituted $C_2$-$C_{20}$ alkenyl group; a halogen substituted or unsubstituted $C_2$-$C_{20}$ alkynyl group; a halogen substituted or unsubstituted $C_2$-$C_{20}$ alkoxy group; a halogen substituted or unsubstituted $C_3$-$C_{20}$ cycloalkyl group; a halogen substituted or unsubstituted $C_1$-$C_{20}$ heterocycloalkyl group; a halogen substituted or unsubstituted $C_3$-$C_{20}$ cycloalkenyl group; a halogen substituted or unsubstituted $C_1$-$C_{20}$ heterocycloalkenyl group; a halogen substituted or unsubstituted $C_6$-$C_{20}$ aryl group; a halogen substituted or unsubstituted $C_6$-$C_{20}$ aryloxy group; a halogen substituted or unsubstituted $C_5$-$C_{20}$ arylthio group; and a halogen substituted or unsubstituted $C_2$-$C_{40}$ heteroaryl group.

For example, $E_1$ and $E_2$ may be each independently selected from a hydrogen atom; a halogen atom; a halogen substituted or unsubstituted $C_1$-$C_{10}$ alkyl group; a halogen substituted or unsubstituted $C_6$-$C_{40}$ aryl group; and a halogen substituted or unsubstituted $C_2$-$C_{40}$ heteroaryl group.

For example, $E_1$ and $E_2$ may be each independently selected from a hydrogen atom, F, Cl, Br, I, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrolyl group, and a pyridinyl group.

For example, $E_1$ and $E_2$ may be each independently selected from a hydrogen atom, a fluorine (F) atom, a methyl group, an ethyl group, a trifluoromethyl group, a tetrafluoroethyl group, and a phenyl group.

For example, the disultone-based compound may be represented by at least one of Formulae 4 and 5:

Formula 4
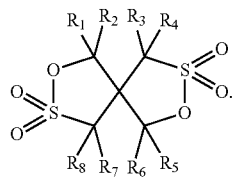

Formula 5
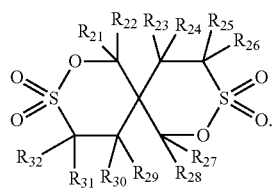

In Formulae 4 and 5, $R_1$ to $R_8$ and $R_{21}$ to $R_{32}$ may be each independently selected from a hydrogen atom; a halogen atom; a halogen substituted or unsubstituted $C_1$-$C_{10}$ alkyl group; a halogen substituted or unsubstituted $C_6$-$C_{20}$ aryl group; and a halogen substituted or unsubstituted $C_1$-$C_{20}$ heteroaryl group.

For example, $R_1$ to $R_8$ and $R_{21}$ to $R_{32}$ may be each independently selected from a hydrogen atom, F, Cl, Br, I, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrol group, and a pyridinyl group.

For example, $R_1$ to $R_8$ and $R_{21}$ to $R_{32}$ may be each independently selected from a hydrogen atom, F, a methyl group, an ethyl group, a propyl group, a trifluoromethyl group, a tetrafluoroethyl group, and a phenyl group.

In some embodiments, the disultone-based compound may be represented by at least one of Formulae 6 to 17:

Formula 6
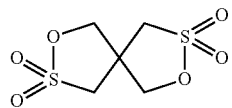

Formula 7
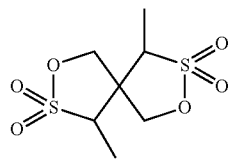

Formula 8
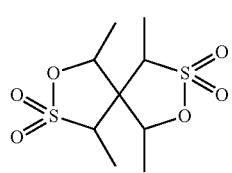

Formula 9
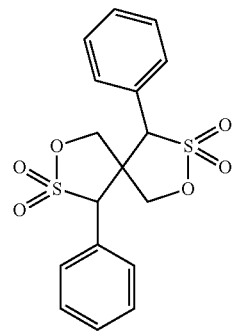

Formula 10
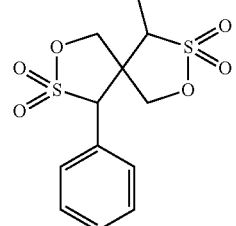

Formula 11
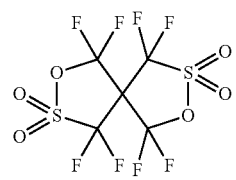

Formula 12
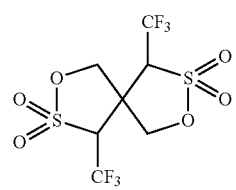

Formula 13
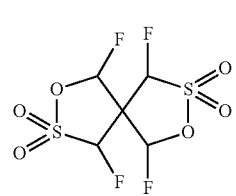

Formula 14
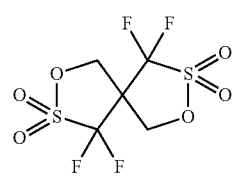

Formula 15
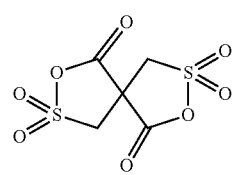

Formula 16
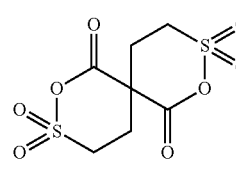

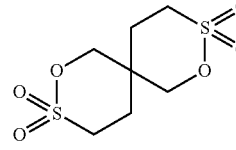

-continued

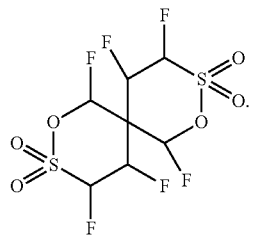

Formula 17

In some embodiments, a boiling point of the disultone-based compound may be 115° C. or higher. When a boiling point of the disultone-based compound is 115° C. or higher, high-temperature stability of the battery may be improved.

In some embodiments, a boiling point of the disultone-based compound may be 120° C. or higher, for example, about 120° C. to about 300° C., about 130° C. to about 300° C., or about 140° C. to about 300° C.

In some embodiments, the non-polar unsaturated group-containing cyclic carbonate compound may include a non-polar unsaturated group such as a vinyl group, a vinylene group, or a combination thereof.

The non-polar unsaturated group-containing cyclic carbonate compound may include at least one selected from vinylene carbonate (VC); a vinylene carbonate derivative having at least one substituent selected from a halogen atom, a cyano group (CN), and a nitro group ($NO_2$); vinylethylene carbonate (VEC); and a vinylethylene carbonate derivative having at least one substituent selected from a halogen atom, a cyano group (CN), and a nitro group ($NO_2$), but embodiments of the present invention are not limited thereto.

Only one type of the non-polar unsaturated group-containing cyclic carbonate compound may be used, or at least two types of the non-polar unsaturated group-containing cyclic carbonate compound may be used at the same time (simultaneously).

For example, the non-polar unsaturated group-containing cyclic carbonate compound may be vinylene carbonate (VC) and/or vinylethylene carbonate (VEC).

Particularly, in vinylene carbonate (VC), carbon atoms having a $sp^2$ hybrid orbital constitute a part of the pentagonal structure. Accordingly, vinylene carbonate (VC) has a relatively unstable structure due to high ring strain, and thus may have a high reactivity aimed at stabilizing its structure. Therefore, vinylene carbonate (VC) may be easily reduced and/or decomposed by a ring-opening reaction during initial charging and thus may contribute to the formation of a stable SEI layer.

An amount of the disultone-based compound and an amount of the non-polar unsaturated group-containing cyclic carbonate compound may be each independently in a range of about 0.1 wt % to about 10 wt % based on the total weight of the organic electrolytic solution, but neither range is limited thereto, and any suitable amount of each compound may be used.

In one embodiment, an amount of the disultone-based compound may be in a range of about 0.1 wt % to about 7 wt % based on the total weight of the electrolytic solution. For example, an amount of the disultone-based compound may be about 0.1 wt % to about 5 wt % based on the total weight of the electrolytic solution. For example, an amount of the disultone-based compound may be about 0.1 wt % to about 3 wt % based on the total weight of the electrolytic solution. For example, an amount of the disultone-based compound may be about 0.1 wt % to about 1 wt % based on the total weight of the electrolytic solution.

In some embodiments, an amount of the non-polar unsaturated group-containing carbonate compound may be in a range of about 0.1 wt % to about 7 wt % based on the total weight of the electrolytic solution. For example, an amount of the non-polar unsaturated group-containing carbonate compound may be in a range of about 0.1 wt % to about 5 wt % based on the total weight of the electrolytic solution. For example, an amount of the non-polar unsaturated group-containing carbonate compound may be in a range of about 0.1 wt % to about 3 wt % based on the total weight of the electrolytic solution. For example, an amount of the non-polar unsaturated group-containing cyclic carbonate compound may be in a range of about 0.1 wt % to about 1 wt % based on the total weight of the electrolytic solution.

A weight ratio of the amount of the disultone-based compound to the amount of the non-polar unsaturated group-containing cyclic carbonate may be in a range of about 1:9 to about 9:1, but the range is not limited thereto.

In some embodiments, a weight ratio of the amount of the disultone-based compound to the amount of the non-polar unsaturated group-containing cyclic carbonate compound may be in a range of about 3:7 to about 7:3, for example, about 5:5 to about 7:3, or about 6:4 to about 7:3.

In some embodiments, a weight ratio of the amount of the disultone-based compound to the amount of the non-polar unsaturated group-containing cyclic carbonate compound may be about 2:1.

The lithium salt of the electrolytic solution for a lithium battery may serve as a source of lithium ions in the battery, and any suitable material that is commonly used in connection with lithium batteries and that may be easily dissolved in the electrolytic solution may be used as the lithium salt. The lithium salt may include at least one selected from LiCl, LiBr, LiI, $LiClO_4$, $LiB_{10}Cl_{10}$, $LiPF_6$, $CF_3SO_3Li$, $CH_3SO_3Li$, $C_4F_9SO_3Li$, $(CF_3SO_2)_2NLi$, $LiN(C_xF_{2x+1}SO_2)(C_yF_{2+y}SO_2)$ (where x and y are each independently a natural number of 1 to 20), $CF_3CO_2Li$, $LiAsF_6$, $LiSbF_6$, $LiAlCl_4$, $LiAlF_4$, lithium chloroborate, low-molecular weight aliphatic lithium carbonate, lithium 4-phenyl borate, and lithium imide, but embodiments of the present invention are not limited thereto.

In order to secure practical (satisfactory) performance of the lithium battery, the lithium salt may be used at a concentration in a range of about 0.1 M to about 2.0 M. When the concentration of the lithium salt is within this range, the resulting electrolytic solution may have good conductivity and viscosity, and thus excellent performance of the electrolytic solution and effective migration of lithium ions may be obtained.

The organic solvent of the electrolytic solution for a lithium battery may serve as a medium through which ions involved in an electrochemical reaction of the battery may migrate. The organic solvent may be a non-aqueous organic solvent. The non-aqueous organic solvent may be a carbonate-based compound, an ester-based compound, an ether-based compound, a ketone-based compound, an alcohol-based compound, an aprotic solvent, or a combination thereof.

The carbonate-based compound may be a chain-type carbonate compound, a ring-type carbonate compound, a fluorocarbonate compound of the chain-type or ring-type carbonate compound, or a combination thereof.

Non-limiting examples of the chain-type carbonate compound may include diethyl carbonate (DEC), dimethyl carbonate (DMC), dipropyl carbonate (DPC), methylpropyl carbonate (MPC), ethylpropylcarbonate (EPC), methylethyl carbonate (MEC), and combinations thereof.

Non-limiting examples of the ring-type carbonate compound may include ethylene carbonate (EC), propylene carbonate (PC), butylene carbonate (BC), and combinations thereof.

Non-limiting examples of the fluorocarbonate compound of the chain-type or ring-type carbonate compound may include fluoroethylene carbonate (FEC), 4,5-difluoroethylene carbonate, 4,4-difluoroethylene carbonate, 4,4,5-trifluoroethylene carbonate, 4,4,5,5-tetrafluoroethylene carbonate, 4-fluoro-5-methylethylene carbonate, 4-fluoro-4-methylethylene carbonate, 4,5-difluoro-4-methylethylene carbonate, 4,4,5-trifluoro-5-methylethylenecarbonate, trifluoromethylethylene carbonate, and combinations thereof.

The non-aqueous organic solvent may include a mixture of the chain-type and ring-type carbonate compounds. For example, when an amount of the ring-type carbonate compound is at least 5 vol % based on the total volume of the non-aqueous organic solvent, improvement in cycle characteristics may be significant. An amount of the ring-type carbonate compound may be in a range of about 5 vol % to about 70 vol % based on the total volume of the non-aqueous organic solvent. When the amount of the ring-type carbonate compound is within this range, dissolution of the lithium salt may be utilized due to the ring-type carbonate compound having a specific dielectric constant of 20 or greater, and thus ion conductivity of the electrolyte may increase.

The carbonate-based compound in the non-aqueous organic solvent may be used as a mixture including the fluoro carbonate compound with the chain-type and/or ring-type carbonate compound. The fluoro carbonate compound may increase solubility of the lithium salt, and thus may improve ion conductivity and may help a thin film to be formed on the negative electrode. In some embodiments, the fluoro carbonate compound may be fluoroethylene carbonate (FEC). An amount of the fluoro carbonate compound may be in a range of about 1 vol % to about 30 vol % based on the total volume of the non-aqueous organic solvent. When the amount of the fluoro carbonate compound is within this range, the fluoro carbonate compound may possess the desired characteristics, while maintaining an appropriate viscosity.

Non-limiting examples of the ester-based compound may include methylacetate, acetate, n-propylacetate, dimethylacetate, methylpropionate, ethylpropionate, γ-butyrolactone, decanolide, valerolactone, mevalonolactone, caprolactone, and methyl formate. Non-limiting examples of the ether-based compound may include dibutyl ether, tetraglyme, diglyme, 1,2-dimethoxyethane, 1,2-diethoxyethane, ethoxymethoxyethane, 2-methyltetrahydrofuran, and tetrahydrofuran, and a non-limiting example of the ketone-based compound is cyclohexanone. Also, non-limiting examples of the alcohol-based compound may include ethylalcohol and isopropyl alcohol.

Non-limiting examples of the aprotic solvent may include dimethylsulfoxide, 1,2-dioxolane, sulfolane, methylosulfolane, 1,3-dimethyl-2-imidazolidinone, N-methyl-2-pyrrolidinone, formamide, dimethylformamide, acetonitrile, nitromethane, trimethylphosphoric acid, triethyl phosphoric acid, trioctyl phosphate, and triester phosphoric acid.

The non-aqueous organic solvent may be used alone or as a mixture of at least two types selected from the above-described compounds, and when the mixture is used as the non-aqueous organic solvent, a mixing ratio of the mixture may be controlled according to the desired battery performance.

As used herein, in the expressions regarding the number of carbons, i.e., a capital "C" followed by a number, for example, "$C_1$-$C_{20}$", "$C_3$-$C_{20}$", or the like, the number such as "1", "3", or "20" following "C" indicates the number of carbons in a particular functional group. That is, a functional group may include, for example, from 1 to 20 carbon atoms. Accordingly, a "$C_1$-$C_4$ alkyl group" refers to an alkyl group having 1 to 4 carbon atoms in the main chain, for example, $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, and/or $(CH_3)_3C$—.

As used herein, a particular radical may refer to a mono-radical or a di-radical depending on the context. For example, when a substituent needs two binding sites for binding with the rest of the molecule, the substituent may be understood as a di-radical. For example, a substituent specified as an alkyl group that needs two binding sites may be a di-radical, such as —$CH_2$—, —$CH_2CH_2$—, or —$CH_2CH(CH_3)CH_2$—. The term "alkylene" as used herein indicates that the radical refers to a di-radical.

As used herein, the terms "alkyl group" or "alkylene group" refers to a saturated aliphatic hydrocarbon group. In some embodiments, the alkyl group may be a monovalent moiety and may be substituted or unsubstituted. Non-limiting examples of the alkyl group include a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, and a cycloheptyl group, each of which may be optionally substituted or not. In some embodiments, the alkylene group may be a divalent moiety and may be substituted or unsubstituted. Non-limiting examples of the alkylene group include a methylene group, an ethylene group, a propylene group, and a butylene group, each of which may be optionally substituted or not, but embodiments of the present invention are not limited thereto.

As used herein, the term "alkenyl group" or "alkenylene group" refers to a hydrocarbon group including at least one carbon-carbon double bond at one or more positions along a carbon chain of the unsubstituted alkyl group or alkylene group. In some embodiments, the alkenyl group may be a monovalent moiety and may be substituted or unsubstituted. Non-limiting examples of the alkenyl group include an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexcenyl group, and a cycloheptenyl group, each of which may be optionally substituted or not, but embodiments of the present invention are not limited thereto. In some embodiments, the alkenylene group may be a divalent moiety and may be substituted or unsubstituted. Non-limiting examples of the alkenylene group include an ethenylene group, a propenylene group, and a butenylene group, each of which may be optionally substituted or not, but embodiments of the present invention are not limited thereto.

As used herein, the term "alkynyl group" refers to a hydrocarbon group including at least one carbon-carbon triple bond at one or more positions along a carbon chain of the unsubstituted alkyl group or alkylene group. In some embodiments, the alkynyl group may be a monovalent moiety and may be substituted or unsubstituted. Non-limiting examples of the alkynyl group include an ethynyl group, a 1-propynyl group, a 1-butynyl group, and a 2-butynyl group, each of which may be optionally substituted or not, but embodiments of the present invention are not limited thereto.

As used herein, the term "cycloalkyl group" or "cycloalkylene group" refers to a carbocyclic ring or ring system that is fully saturated. In some embodiments, the "cycloalkyl group" may be a monovalent moiety and may be substituted or unsubstituted. Non-limiting examples of the cycloalkyl group include a cyclopropyl group, a cyclobutyl group, a cyclopentyl group, and a cyclohexyl group, each of which may be optionally substituted or not, but embodiments of the present invention are not limited thereto. In some embodiments, the "cycloalkylene group" may be a divalent moiety and may be substituted or unsubstituted. Non-limiting examples of the cycloalkylene group include a cyclopropylene group, a cyclobutylene group, a cyclopentylene group, and a cyclohexylene group, of which may be optionally substituted or not, but embodiments of the present invention are not limited thereto.

As used herein, the term "heterocycloalkyl group" or "heterocycloalkylene group" refers to a carbocyclic ring or ring system that is fully saturated, in which at least one member of a ring is a heteroatom and is not carbon. For example, the hetero atom may be selected from oxygen, sulfur, and nitrogen, but embodiments of the present invention are not limited thererto. In some embodiments, the heterocycloalkyl group may be a monovalent moiety and may be substituted or unsubstituted. In some embodiments, the heterocycloalkylene group may be a divalent moiety and may be substituted or unsubstituted.

As used herein, the terms "aryl group" or "arylene group" refers to an aromatic ring or ring system, each including only carbon atoms in its backbone (where "ring system" includes at least two rings fused to each other, which share two or more adjacent carbon atoms). When the aryl group is a ring system, each ring in the ring system may be aromatic. In some embodiments, the aryl group may be a monovalent moiety and may be substituted or unsubstituted. Non-limiting examples of the aryl group include a phenyl group, a biphenyl group, a naphthyl group, a phenanthrenyl group, and a naphthacenyl group, each of which may be optionally substituted or not, but embodiments of the present invention are not limited thereto. In some embodiments, the arylene group may be a divalent moiety and may be substituted or unsubstituted. Non-limiting examples of the arylene group include a phenylene group, a biphenylene group, and a terphenylene group, each of which may be optionally substituted or not, but embodiments of the present invention are not limited thereto.

As used herein, the term "heteroaryl group" or "heteroarylene group" refers to an aromatic ring or a ring system with two or more fused rings, in which at least one member of a ring is a heteroatom and is not carbon. In the fused ring system, at least one heteroatom may be in at least one ring. For example, the heteroatom may be oxygen, sulfur, or nitrogen, but is not limited thereto. In some embodiments, the heteroaryl group may be a monovalent moiety and may be substituted or unsubstituted. Non-limiting examples of the heteroaryl group include a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, and an indolyl group, each of which may be optionally substituted or not, but embodiments of the present invention are not limited thereto. In some embodiments, the heteroarylene group may be a divalent moiety and may be substituted or unsubstituted. Non-limiting examples of the heteroarylene group include a pyrrolylene group, a thiophenylene group, a furanylene group, an imidazolylene group, a pyrazolylene group, and a thiazolylene group, each of which may be optionally substituted or not, but embodiments of the present invention are not limited thereto.

As used herein, the term "halogen atom" refers to a stable atom belonging to Group 17 of the periodic table of elements, for example, fluorine, chlorine, bromine, or iodine. For example, the halogen atom may be fluorine or chlorine.

A substituted functional group may be derived by substituting at least one hydrogen atom in an unsubstituted corresponding functional group with another atom or functional group. Unless stated otherwise, a substituted functional group refers to a functional group substituted with at least one substituent selected from a $C_1$-$C_{20}$ alkyl group, a $C_2$-$C_{20}$ alkenyl group, a $C_3$-$C_{20}$ cycloalkyl group, a $C_3$-$C_{20}$ cycloalkenyl group, and a $C_6$-$C_{20}$ aryl group.

According to one or more embodiments of the present invention, a lithium battery includes a positive electrode, a negative electrode, and any of the above-described organic electrolytic solutions. In particular, the lithium battery includes a positive electrode including a positive active material; a negative electrode facing the positive electrode and including a negative active material; a separator between the positive electrode and the negative electrode; and an electrolyte.

For example, the negative electrode of the lithium battery may include graphite. When the negative electrode includes graphite, the graphite may react with the electrolytic solution to form a firm modified SEI layer.

The lithium battery may have a driving voltage of about 3.8 V or greater. For example, the lithium battery may have a high driving voltage in a range of about 3.8 V to about 4.2 V. For example, the lithium battery may have a high driving voltage in a range of about 3.8 V to about 4.0 V. When the lithium battery includes the electrolytic solution simultaneously including the disultone-based compound and the non-polar unsaturated group-containing cyclic carbonate compound, the lithium battery may operate at a high driving voltage due to the firm modified SEI layer and the modified protection layer that are formed during charging. The term "driving voltage" as used herein refers to a voltage of the manufactured battery during actual charging and discharging of the lithium battery. Thus, when a driving voltage of the lithium battery is 3.8 V or greater, a charge cutoff voltage may be 3.8 V or greater during charging.

According to one or more embodiments of the present invention, the lithium battery may be prepared as follows.

The positive active material may be any suitable material available in the art and may be, for example, a lithium-containing metal oxide. For example, the positive active material may include at least one composite oxide of lithium and a metal selected from cobalt, manganese, nickel, and combinations thereof. For example, the positive active material may be a compound represented by one of the following formulae: $Li_aA_{1-b}B'_bD_2$ (where, $0.90 \leq a \leq 1$, and $0 \leq b \leq 0.5$); $Li_aE_{1-b}B'_bO_{2-c}D_c$ (where, $0.90 \leq a \leq 1$, $0 \leq b \leq 0.5$, and $0 \leq c \leq 0.05$); $LiE_{2-b}B'_bO_{4-c}D_c$ (where, $0 \leq b \leq 0.5$, and $0 \leq c \leq 0.05$); $Li_aNi_{1-b-c}Co_bB'_cD_\alpha$ (where, $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where, $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where, $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (where, $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where, $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where, $0.90 \leq a \leq 1$, $0 \leq b \leq 0.5$, $0 \leq c \leq 0.05$, and $0 < \alpha < 2$); $Li_aNi_bE_cG_dO_2$ (where, $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (where, $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1$, and $0.001 \leq b \leq 0.1$); $Li_aCoG_bO_2$ (where, $0.90 \leq a \leq 1$, and $0.001 \leq b \leq 0.1$); $Li_aMnG_bO_2$ (where, $0.90 \leq a \leq 1$, and $0.001 \leq b \leq 0.1$); $Li_aMn_2G_bO_4$ (where, $0.90 \leq a \leq 1$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where, $0 \leq f \leq 2$); $Li_{(3-f)}Fe_2(PO_4)_3$ (where, $0 \leq f \leq 2$); and $LiFePO_4$.

In the formulae above, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

In some embodiments, the positive active material may be selected from $LiCoO_2$, $LiMn_xO_{2x}$ (where $x=1$ or 2), $LiNi_{1-x}Mn_xO_{2x}$ (where $0<x<1$), $LiNi_{1-x-y}Co_xMn_yO_2$ (where $0 \leq x \leq 0.5$, and $0 \leq y \leq 0.5$), and $LiFePO_4$.

Each of the compounds listed above as positive active materials may have a coating layer on its surface. Alternatively, a mixture of a compound without a coating layer and a compound having a coating layer (the compounds being selected from the compounds listed above) may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be selected from magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), and mixtures thereof. The coating layer may be formed using (utilizing) any suitable method that does not adversely affect the physical properties of the positive active material when a compound of the coating element is used. For example, the coating layer may be formed using a spray coating method, a dipping method, and/or the like. These methods should be apparent to those of ordinary skill in the art, and thus a detailed description thereof will not be provided here.

The positive electrode may be prepared as follows.

For example, the positive active material, a binder, and, optionally, a conducting agent are dispersed in a solvent to prepare a positive active material composition, and the positive active material composition may be molded into a predetermined (or set) shape, or the positive active material composition may be directly coated on a metallic current collector to prepare the positive electrode.

The binder included in the positive active material composition improves the binding of the positive active material to the conducting agent and binding of the positive active material to the current collector, and an amount of the binder may be in a range of about 1 part to about 50 parts by weight based on 100 parts by weight of the positive active material. In some embodiments, an amount of the binder may be in a range of about 1 part to about 30 parts by weight, for example, about 1 part to about 20 parts by weight, or about 1 part to about 15 parts by weight, based on 100 parts by weight of the positive active material. The binder may be selected from polyvinyl fluoride (PVdF), polyvinylidene chloride, polybenzimidazole, polyimide, polyvinyl acetate, polyacrylonitrile, polyvinyl alcohol, carboxymethylcellulose (CMC), starch, hydroxypropylcellulose, reproduced cellulose, polyvinylpyrrolidone, tetrafluoroethylene, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenyl sulfide, polyamideimide, polyetherimide, polyethylene sulfone, polyamide, polyacetal, polyphenylene oxide, polybutylene terephthalate, ethylene-propylene-diene monomer (EPDM), sulfonated EPDM, styrene butadiene rubber (SBR), fluorine rubber, and combinations thereof, but embodiments of the present invention are not limited thereto.

The positive electrode may optionally further include a conducting agent that may further improve an electrical conductivity by providing a conduction pathway to the positive active material. The conducing agent may be any suitable conducting material commonly used in connection with lithium batteries, and non-limiting examples of the conducing material may include a carbonaceous material such as carbon black, acetylene black, ketjen black, and/or carbon fibers; a metal-based material such as a metal powder or metal fiber of copper, nickel, aluminum, and/or silver; a conductive polymer such as a polyphenylene derivative; or a conducting material including a mixture thereof. An amount of the conducting agent may be appropriately controlled. For example, a weight ratio of the positive active material and the conducting agent may be in a range of about 99:1 to about 90:10.

Non-limiting examples of the solvent may include N-methylpyrrolidone (NMP), acetone, and water. The solvent may be used to ease a coating process of the positive active material composition on a current collector.

In some embodiments, a thickness of the current collector may be in a range of about 3 μm to about 500 μm. Any suitable material having conductivity may be used as the current collector so long as it does not generate any chemical change in the battery, and non-limiting examples of such material may include copper, stainless steel, aluminum, nickel, titanium, calcined carbon, aluminum and/or stainless steel surface-treated with carbon, nickel, titanium, and/or silver, and an aluminum-cadmium alloy. In some embodiments, fine surface roughness may be formed on the surface of the current collector to increase an adhesive strength of the positive active material to the current collector. The current collector may be formed into various shapes such as film, sheet, foil, net, porous body, foamed body, or nonwoven body, but the shape of the current collector is not limited thereto.

The positive active material composition may be directly coated on an aluminum current collector, or the positive active material composition may be cast on a separate support to form a positive active material film, which may then be separated from the support and laminated on an aluminum current collector to prepare a positive electrode plate, and then the positive electrode plate may be dried and pressed to prepare the positive electrode.

Next, a negative electrode may be prepared as follows. The negative electrode may be prepared in the same (or substantially the same) manner as in the preparation of the positive electrode, except that a negative active material is used instead of the positive active material. A binder, a conducting agent, and a solvent in a negative active material composition may be the same as those described in connection with the preparation of the positive electrode.

The negative active material composition may be directly coated on a copper current collector, or the negative active material composition may be cast on a separate support to form a negative active material film, which may then be separated from the support and laminated on a copper current collector to prepare a negative electrode plate, and then the negative electrode plate may be dried and pressed to prepare the negative electrode.

Any suitable negative active material available in the art may be used as the negative active material for the lithium battery. For example, the negative active material may include at least one selected from lithium metal, a metal that is alloyable with lithium, a transition metal oxide, a non-transition metal oxide, and a carbonaceous material.

Non-limiting examples of the metal alloyable with lithium include Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof, and Y is not Si), and a Sn—Y alloy (where Y is an alkali metal, an alkali earth metal, a Group XIII element, a Group XIV element, a transition metal, a rare earth element, or a combination thereof, and Y is not Sn). Y may be selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), and combinations thereof.

For example, the transition metal oxide may be a lithium titanium oxide, a vanadium oxide, or a lithium vanadium oxide.

For example, the non-transition metal oxide may be $SnO_2$ or $SiO_x$ (where $0<x<2$).

The carbonaceous material may be crystalline carbon, amorphous carbon, or a mixture thereof. Non-limiting examples of the crystalline carbon include graphite, such as natural graphite and/or artificial graphite that are in amorphous, plate, flake, spherical, and/or fibrous form. Examples of the amorphous carbon include soft carbon, hard carbon, meso-phase pitch carbides, and sintered coke, but are not limited thereto.

Next, a separator to be positioned between the positive electrode and the negative electrode may be prepared. The positive electrode and the negative electrode may be separated by the separator, and the separator for the lithium battery may be any suitable separator that is commonly used in connection with lithium batteries. The separator may have low resistance to migration of ions in an electrolyte and excellent electrolyte-retaining ability. Non-limiting examples of the materials for the separator include glass fiber, polyester, Teflon, polyethylene, polypropylene, polytetrafluoroethylene (PTFE), and a combination thereof, each of which may be a non-woven or woven fabric. A pore diameter of the separator may be in a range of about 0.01 μm to about 10 μm, and a thickness of the separator may be in a range of about 5 μm to about 300 μm.

The lithium secondary battery may be prepared by stacking an electrode assembly having a bicell structure including the positive electrode/separator/negative electrode/separator/positive electrode or a layer-built cell structure in which the unit cells are repeated, inserting the resulting structure into a cylinder (e.g., a cylindrical case), injecting an electrolyte into the cylinder, and sealing the cylinder.

An example of a lithium battery 1 according to one or more embodiments of the present invention is shown in FIG. 1. Referring to FIG. 1, the lithium battery 1 includes a positive electrode 3, a negative electrode 2, and a separator 4. The positive electrode 3, the negative electrode 2, and the separator 4 are wound or folded, and then sealed in a battery case 5. Then, the battery case 5 is filled with an organic electrolytic solution and sealed with a cap assembly 6, thereby completing the manufacture of the lithium battery 1. The battery case 5 may be a cylindrical type (kind), a rectangular type (kind), or a thin-film type (kind). The lithium battery 1 may be a lithium ion battery.

The lithium secondary battery may be a winding-type (or kind) or a stack-type (kind) of battery, depending on the shape of the electrode, or may be a cylindrical type (e.g., a cylindrical battery), a rectangular type (e.g., a rectangular battery), a coin type (e.g., a coin battery), or a pouch type (e.g., a pouch battery), depending on an external material (e.g., depending on the shape of the case).

The lithium battery may be used in a unit battery of a medium-to-large-sized device battery module including a plurality of batteries, as well as in a battery that is used as a power source for a small device.

Examples of the medium-to-large-sized device include a power tool; an xEV such as an electric vehicle (EV), a hybrid electric vehicle (HEV), and/or a plug-in hybrid electric vehicle (PHEV); an electronic bicycles such as an E-bike and/or an E-scooter; an electric golf cart; an electric truck; an electric commercial vehicle; and an electrical power storage system, but embodiments of the present invention are not limited thereto. In some embodiments, the lithium battery may be used in any device that requires an operation of the device at a high output, high voltage, and high temperature.

Hereinafter, one or more embodiments of the present invention will be described in more detail with reference to the following examples. However, these examples are provided for illustrative purposes only and are not intended to limit the scope of the present disclosure.

Manufacture Example 1: Synthesis of Compound of Formula 6

A compound of Formula 6 may be manufactured according to Reaction Scheme 1.

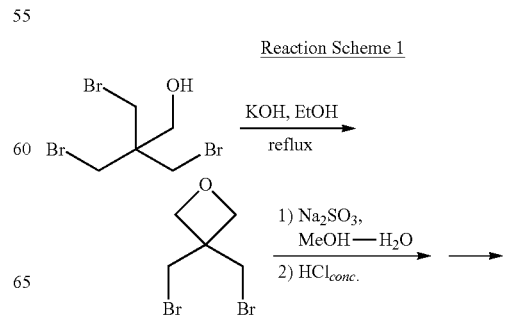

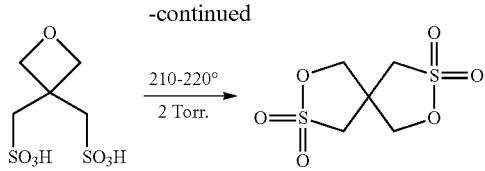

10.34 g (0.156 mol) of potassium hydroxide dissolved in 200 ml of ethanol was dropwise added into a solution of 50 g (0.154 mol) of pentaerythritol tribromide dissolved in 200 ml of ethanol, and the resulting mixture was refluxed for about 30 minutes. The resulting reaction product was cooled down to room temperature, and then filtered to remove KBr, followed by evaporating ethanol. The residue was distilled in a vacuum to obtain 28 g of (0.115 mole) of 3,3-bis (bromomethyl)oxacyclobutane (yield: 75%, b.p.: 72° C. to 78° C. @ 10 mmHg).

1H NMR (400 MHz, CDCl3): δ 3.84 (s, 4H), 4.42 (s, 4H), 4.58 (s, 4H)

A solution of 28 g (0.115 mole) of 3,3-bis(bromomethyl) oxacyclobutane dissolved in a mixed solvent of 94 ml of methanol and 28 ml or water was dropwise added into a solution of 44.8 g (0.358 mol) of $Na_2SO_3$ dissolved in 252 ml of water. The resulting mixture was refluxed for about 3.5 hours, and the solvent was removed under vacuum. The residue was treated with 200 ml of conc. HCl, and filtered to remove NaCl thereby obtaining a sulfonic acid solution, which was then filtered in a vacuum. The resulting residue oil was heated at about 210° C. to about 220° C. (at about 2 mm Hg) for about 2 hours to obtain black mass, which was then extracted with boiling dioxane and then filtered in hot state. The filtrate was cooled down to crystallize, and 10 g of disulfone were obtained (yield: 38%, m.p.: 244° C. to 246° C.).

1H NMR (400 MHz, DMSO-d6): δ 3.87 (s, 2H), 3.88 (s, 2H), 4.58 (s, 4H) Formula 6

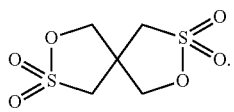 [SMILES: O=S1(=O)CC2(CO1)COS(=O)(=O)C2]

Preparation of Electrolytic Solution

Example 1

1.15 M $LiPF_6$ as a lithium salt, 1 wt % of the compound of Formula 6 prepared in Manufacture Example 1 above, and 0.5 wt % of vinylene carbonate (VC, available from Aldrich) were added into a mixed solvent of ethylenecarbonate (EC), ethylmethylcarbonate (EMC), and dimethylcarbonate (DMC) in a volume ratio of 2:4:4 to obtain an electrolytic solution.

Example 2

An electrolytic solution was prepared in the same (or substantially the same) manner as in Example 1, except that the amount of the vinylene carbonate was changed from 0.5 wt % to about 1 wt %.

Example 3

An electrolytic solution was prepared in the same (or substantially the same) manner as in Example 1, except that the amount of the compound represented by Formula 6 was changed from 1 wt % to about 2 wt %.

Example 4

An electrolytic solution was prepared in the same (or substantially the same) manner as in Example 1, except that vinylethylene carbonate (VEC) was used instead of vinylene carbonate (VC).

Example 5

An electrolytic solution was prepared in the same (or substantially the same) manner as in Example 2, except that vinylethylene carbonate (VEC) was used instead of vinylene carbonate (VC).

Example 6

An electrolytic solution was prepared in the same (or substantially the same) manner as in Example 3, except that vinylethylene carbonate (VEC) was used instead of vinylene carbonate (VC).

Comparative Example 1

An electrolytic solution was prepared in the same (or substantially the same) manner as in Example 1, except that the compound represented by Formula 6 and the vinylene carbonate (VC) compound were not used.

Comparative Example 2

An electrolytic solution was prepared in the same (or substantially the same) manner as in Example 1, except that the compound represented by Formula 6 was not used.

Comparative Example 3

An electrolytic solution was prepared in the same (or substantially the same) manner as in Example 2, except that 1,3-propane sultone represented by Formula 18 was used instead of the compound represented by Formula 6.

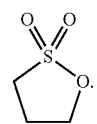

Formula 18

Comparative Example 4

An electrolytic solution was prepared in the same (or substantially the same) manner as in Example 3, except that 1,3-propane sultone represented by Formula 18 was used instead of the compound represented by Formula 6.

Comparative Example 5

An electrolytic solution was prepared in the same (or substantially the same) manner as in Example 4, except that the compound represented by Formula 6 was not used.

Preparation of Lithium Battery

Example 7

Preparation of Positive Electrode

About 93.0 wt % of $LiNi_{60}Co_{20}Mn_{20}O_2$ as a positive active material, about 4.0 wt % of Denka black as a conducting agent, and about 3.0 wt % of PVDF (Solef® 6020, available from Solvay) as a binder were mixed with N-methyl-2-pyrrolidone as a solvent and dispersed in the solvent for about 30 minutes (while using a mechanical stirrer) to prepare a positive active material composition. The positive active material composition was coated on a 20 μm-thick aluminum (Al) current collector to a thickness of about 60 μm with a doctor blade. Then, the resultant was dried in a hot-air dryer at about 100° C. for about 0.5 hours, and then at about 120° C. in a vacuum for 4 hours, followed by roll-pressing, thus manufacturing a positive electrode having a positive active material layer formed on the current collector. The prepared positive active material layer had a density of 3.15 g/cc and a loading level of 27.05 mg/cm². (Preparation of Negative Electrode)

About 97 wt % of graphite particles (MC20, available from Mitsubishi Chemical), about 1.5 wt % of BM408 (available from Daicel) as a conducting agent, and 1.5 wt % of BM400-B (available from Zeon) as a binder were mixed with N-methyl-2-pyrrolidone as a solvent and dispersed in the solvent for about 60 minutes (while using a mechanical stirrer) to prepare a negative active material composition. The negative active material composition was coated on a 10 μm-thick copper (Cu) current collector to a thickness of about 60 μm with a doctor blade. Then, the resultant was dried in a hot-air dryer at about 100° C. for about 0.5 hours, and then at about 120° C. in a vacuum for 4 hours, followed by roll-pressing, thus manufacturing a negative electrode having a negative active material layer formed on the current collector. The prepared negative active material layer had a density of 1.55 g/cc and a loading level of 14.36 mg/cm². (Manufacture of Lithium Secondary Battery)

A lithium battery was manufactured by using the positive electrode, the negative electrode, a 18 μm-thick polyethylene separator with a ceramic coating on the surface, and the electrolytic solution prepared in Example 1.

Examples 8 to 12

Lithium secondary batteries were manufactured in the same (or substantially the same) manner as in Example 7, except that the electrolytic solutions of Examples 2 to 6 were used instead of the electrolytic solution of Example 1, respectively.

Comparative Examples 6 to 10

Lithium secondary batteries were manufactured in the same (or substantially the same) manner as in Example 7, except that the electrolytic solutions of Comparative Examples 1 to 5 were used instead of the electrolytic solution of Example 1, respectively.

Evaluation Example 1: Evaluation of Room-Temperature (25° C.) Charge-Discharge Characteristics at 4.2 V of Charge Cutoff Voltage The lithium batteries manufactured according to Examples 7 to 12 and Comparative Examples 6 to 10 were each charged at a constant current of 0.1 C rate at about 25° C. to a voltage of about 4.2 V (vs. Li), and then the charging were cut-off at a current of 0.05 C rate while maintaining a constant voltage mode at 4.2 V, followed by discharging with a constant current of 0.1 C rate until the voltage reached about 2.8 V (vs. Li) (formation process, $1^{st}$ cycle).

After the $1^{st}$ cycle of the formation process, each of the lithium batteries was charged at a constant current of 1.0 C rate at about 25° C. to a voltage of about 4.2 V (vs. Li), and then the charging were cut-off at a current of 0.05 C rate while maintaining a constant voltage mode at 4.2 V, followed by discharging with a constant current of 0.2 C rate until the voltage reached about 2.8 V (vs. Li) (formation process, $2^{nd}$ cycle).

After the $2^{nd}$ cycle of the formation process, each of the lithium battery was charged at a constant current of 1.0 C rate at about 25° C. to a voltage of about 4.2 V (vs. Li), and then the charging were cut-off at a current of 0.05 C rate while maintaining a constant voltage mode at 4.2 V, followed by discharging with a constant current of 1.0 C rate until the voltage reached about 2.75 V (vs. Li). This cycle of charging and discharging was repeated 150 times.

A rest time of about 10 minutes was allowed after each charge and discharge cycle.

Figure 2:
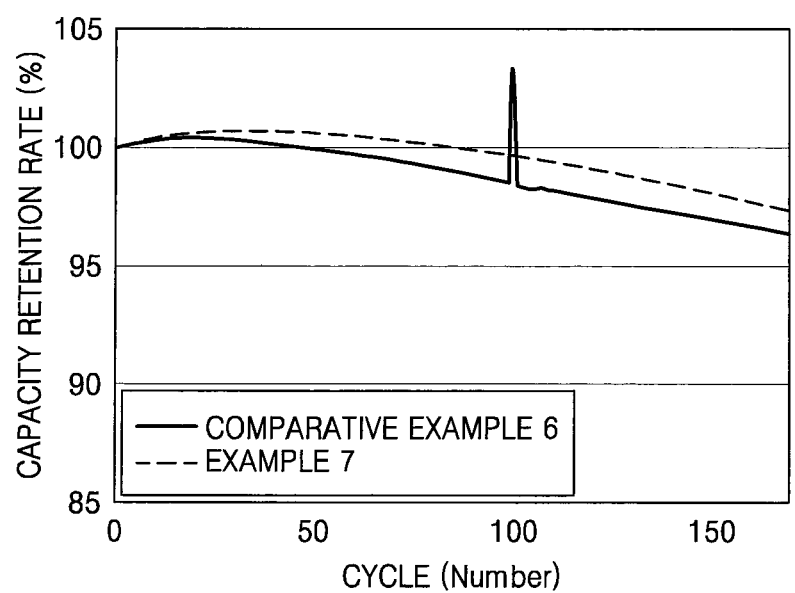
FIG. 2 is a graph showing room temperature (25° C.) lifespan characteristics of lithium secondary batteries prepared according to Example 7 and Comparative Example 6 and charged/discharged with 4.2 V charge cutoff voltage.

Some of the charge-discharge test results are shown in Table 1 and FIG. 2. A capacity retention rate at each of the cycles may be calculated using Equation 1 below:

$$\text{Capacity retention rate} = [\text{Discharge capacity at each cycle}/\text{Discharge capacity at } 1^{st} \text{ cycle}] \times 100. \quad \text{Equation 1}$$

Evaluation Example 2: Evaluation of High-Temperature (45° C.) Charge-Discharge Characteristics at 4.2 V of Charge Cutoff Voltage The charging/discharging characteristics of the lithium secondary batteries manufactured according to Examples 7 to 12 and Comparative Examples 6 to 10 were evaluated in the same (or substantially the same) manner as in Evaluation Example 1, except that the charging/discharging characteristics test was performed at a temperature of 45° C. instead of 25° C.

TABLE 1

| | Added compound and its amount (wt %) | CRR [%] (@25° C.) | CRR [%] (@45° C.) |
|---|---|---|---|
| Example 7 | Compound represented by Formula 6 (1 wt %) and VC (0.5 wt %) | 98.2 | 95.1 |
| Example 8 | Compound represented by Formula 6 (1 wt %) and VC (1 wt %) | 99.0 | 97.8 |
| Example 9 | Compound represented by Formula 6 (2 wt %) and VC (1 wt %) | 98.7 | 98.4 |
| Comparative Example 6 | — | 96.8 | 92.4 |
| Comparative Example 7 | VC (0.5 wt %) | 97.4 | 93.0 |
| Comparative Example 8 | Propanesultone (1 wt %) and VC (1 wt %) | 97.7 | 95.3 |

Figure 3:
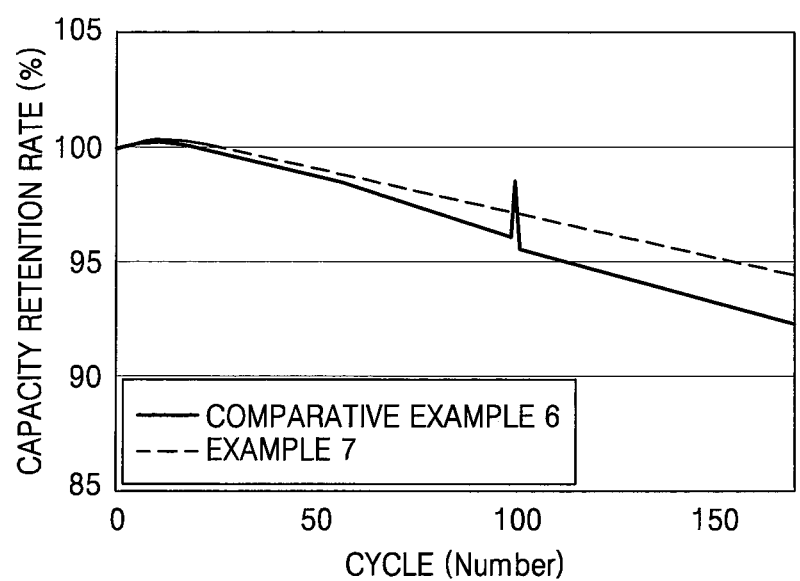
FIG. 3 is a graph showing high temperature (45° C.) lifespan characteristics of the lithium secondary batteries prepared according to Example 7 and Comparative Example 6 and charged/discharged with 4.2 V charge cutoff voltage.

As shown in Table 1 and FIGS. 2 and 3, the lithium secondary batteries of Examples 7 to 9 including a combination of the compounds according to embodiments of the present invention were found to have significantly improved room-temperature and high-temperature lifespan characteristics, compared to the lithium battery of Comparative Example 6 including no additive and the lithium battery of Comparative Example 7 including VC alone.

Figure 6:
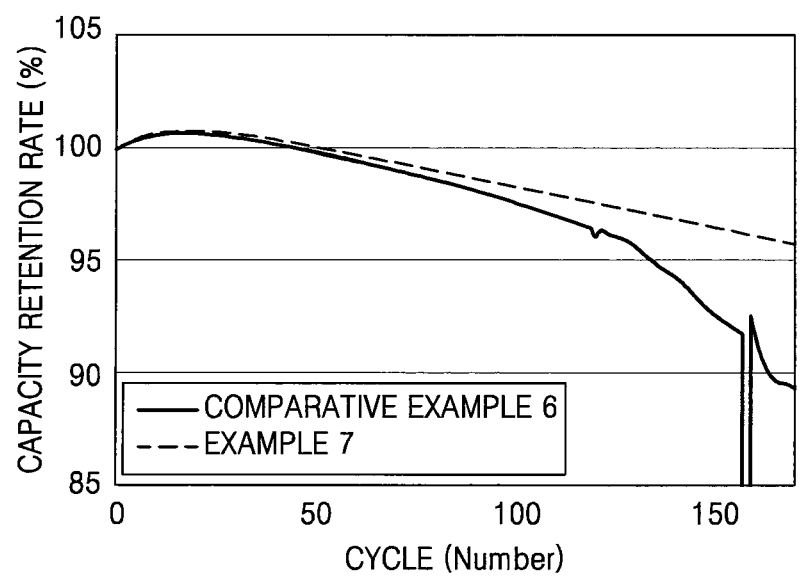
FIG. 6 is a graph showing high temperature (45° C.) lifespan characteristics of the lithium secondary batteries prepared according to Example 7 and Comparative Example 6 and charged/discharged with 4.3 V cutoff voltage.

12 and Comparative Examples 6 to 10 were evaluated in the same (or substantially the same) manner as in Evaluation Example 3, except that a temperature was 45° C. instead of 25° C. Some of the results of the charging/discharging test are shown in Table 2 and FIG. 6.

TABLE 2

|  | Added compound and its amount (wt %) | CRR [%] (@25° C.) | CRR [%] (@45° C.) |
|---|---|---|---|
| Example 7 | Compound represented by Formula 6 (1 wt %) and VC (0.5 wt %) | 97.5 | 95.8 |
| Example 8 | Compound represented by Formula 6 (1 wt %) and VC (1 wt %) | 98.8 | 97.1 |
| Example 9 | Compound represented by Formula 6 (2 wt %) and VC (1 wt %) | 98.8 | 97.4 |
| Example 10 | Compound represented by Formula 6 (1 wt %) and VEC (0.5 wt %) | 97.0 | 96.4 |
| Example 11 | Compound represented by Formula 6 (1 wt %) and VEC (1 wt %) | 97.4 | 96.8 |
| Example 12 | Compound represented by Formula 6 (2 wt %) and VEC (1 wt %) | 97.2 | 97.0 |
| Comparative Example 6 | — | 96.1 | 92.6 |
| Comparative Example 7 | VC (0.5 wt %) | 96.5 | 93.7 |
| Comparative Example 8 | Propanesultone (1 wt %) and VC (1 wt %) | 97.2 | 93.9 |
| Comparative Example 9 | Propanesultone (2 wt %) and VC (1 wt %) | 98.7 | 95.8 |
| Comparative Example 10 | VEC (0.5 wt %) | 96.2 | 93.7 |

In addition, the lithium secondary battery of Example 8 including a combination of compounds according to embodiments of the present invention was found to have significantly improved room-temperature and high-temperature lifespan characteristics, as compared to the lithium battery of Comparative Example 8 including 1,3-propanesultone instead of the compound represented by Formula 6 at the equivalent amount. This is at least partially because the compound represented by Formula 6 has two rings that are linked in a spiro form, and thus a SEI layer and a protection layer formed during charging and discharging of the battery were more stable as compared to the battery in which 1,3-propanesultone was used.

Figure 4:
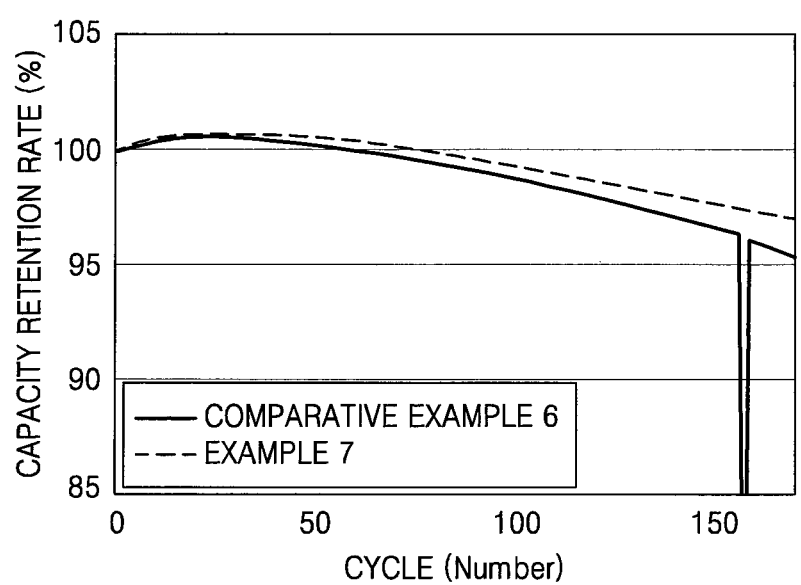
FIG. 4 is a graph showing room temperature (25° C.) lifespan characteristics of the lithium secondary batteries prepared according to Example 7 and Comparative Example 6 and charged/discharged with 4.3 V charge cutoff voltage.

Evaluation Example 3: Evaluation of Room-Temperature (25° C.) Charge-Discharge Characteristics at 4.3 V of Charge Cutoff Voltage Charging/discharging characteristics of the lithium secondary batteries manufactured according to Examples 7 to 12 and Comparative Examples 6 to 10 were evaluated in the same (or substantially the same) manner as in Evaluation Example 1, except that a charge cutoff voltage was 4.3 V. Some of the results of the charging/discharging test are shown in Table 2 and FIG. 4.

Figure 5:
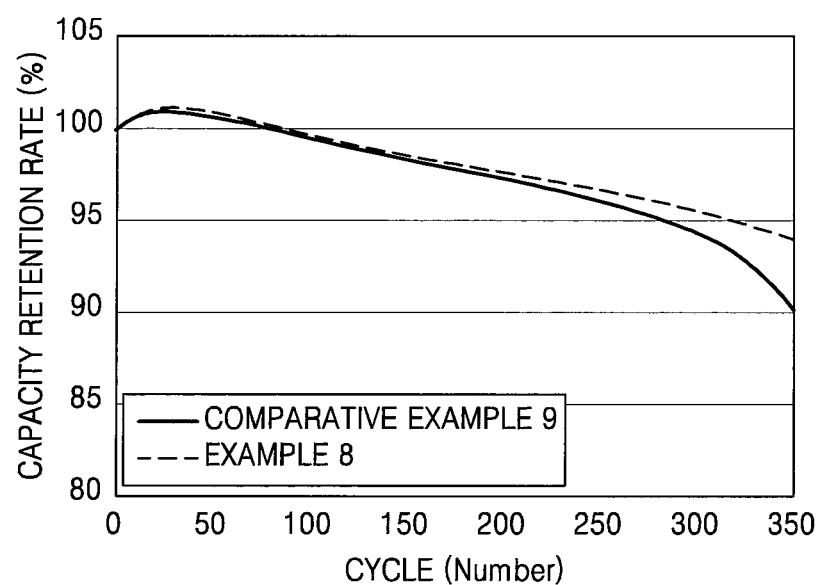
FIG. 5 is a graph showing room temperature (25° C.) lifespan characteristics of lithium secondary batteries prepared according to Example 8 and Comparative Example 9 and charged/discharged with 4.3 V charge cutoff voltage.

Also, the charging and discharging cycle with respect to the lithium secondary batteries manufactured according to each of Comparative Example 9 and Example 8 was repeated 150 times, and the results are shown in FIG. 5.

Evaluation Example 4: Evaluation of High-Temperature (45° C.) Charge-Discharge Characteristics at 4.3 V of Charge Cutoff Voltage Charging/discharging characteristics of the lithium secondary batteries manufactured according to Examples 7 to As shown in Table 2 and FIGS. 4 and 6, the lithium secondary batteries manufactured according to Examples 7 to 12 including a combination of the compounds according to embodiments of the present invention were found to have significantly improved room-temperature and high-temperature lifespan characteristics, as compared to the lithium battery of Comparative Example 6 including no additive and the lithium batteries of Comparative Examples 7 and 10 including VC or VEC alone, even at the charge cutoff voltage of 4.3 V.

Also, the lithium secondary batteries manufactured according to Examples 8 and 9 and including a combination of compounds according to embodiments of the present invention were found to have significantly improved room-temperature and high-temperature lifespan characteristics, as compared to the lithium batteries manufactured according to Comparative Examples 8 and 9 and including 1,3-propanesultone instead of the compound represented by Formula 6 at the equivalent amount.

Evaluation Example 5: Evaluation of High-Temperature Stability

The lithium batteries manufactured according to each of Example 7 and Comparative Example 6 were each charged at a constant current of 0.5 C rate at about 25° C. to a voltage of about 4.3 V, and then charged with a constant voltage while maintaining the voltage at 4.3 V until a current reached 0.05 C, followed by discharging with a constant current of 0.5 C rate until the voltage reached about 2.75 V (1$^{st}$ cycle).

After the 1$^{st}$ cycle, each of the lithium batteries was charged at a constant current of 0.5 C rate to a voltage of about 4.3 V, and then charged with a constant voltage while maintaining the voltage at 4.3 V until a current reached 0.05

C, followed by discharging with a constant current of 0.2 C rate until the voltage reached about 2.80 V ($2^{nd}$ cycle).

After the $2^{nd}$ cycle, each of the lithium batteries was charged at a constant current of 0.5 C rate to a voltage of about 4.3 V, and then charged with a constant voltage while maintaining the voltage at 4.3 V until a current reached 0.05 C, followed by discharging with a constant current of 0.2 C rate until the voltage reached about 2.80 V ($3^{rd}$ cycle). A discharge capacity at the $3^{rd}$ cycle was considered as a standard capacity.

Figure 7:
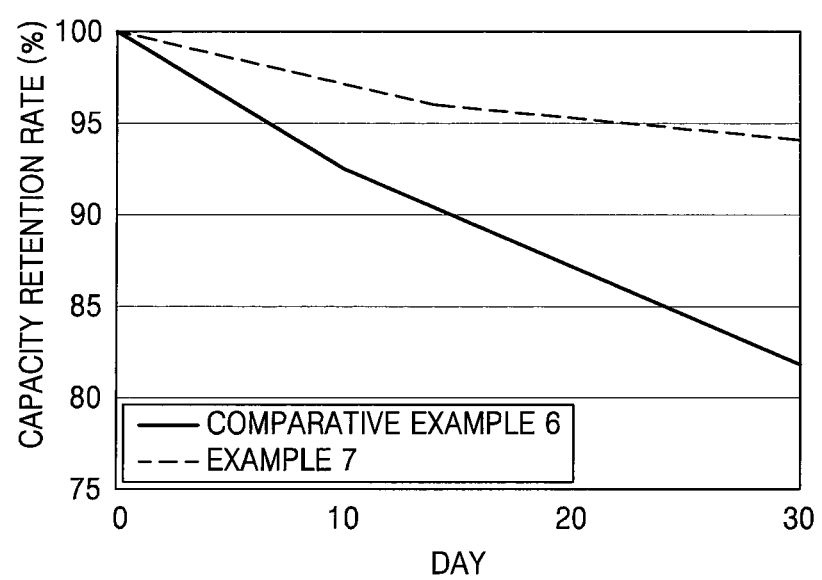
FIG. 7 is a graph showing lifespan characteristics of the lithium secondary batteries prepared according to Example 7 and Comparative Example 6, when the batteries remained at a temperature of 60° C.

After the $3^{rd}$ cycle, each of the lithium batteries through was charged at a constant current of 0.5 C rate to a voltage of about 4.3 V, and then charged with a constant voltage while maintaining the voltage at 4.3 V until a current reached 0.05 C. Next, the charged batteries were left in an oven at a temperature of 60° C. for 10 days, 20 days, and 30 days, followed by taking the batteries out of the oven and discharging those with a constant current of 0.1 C rate until the voltage reached about 2.80 V. The results are shown in FIG. 7.

A capacity retention rate of the batteries after they remained at a high temperature may be calculated using Equation 2 below:

Capacity retention rate after the battery remained at high temperature [%]=[Discharge capacity after the battery remained at high temperature at $4^{th}$ cycle/Standard capacity]×100.  Equation 2

(A standard capacity in Equation 2 is a discharge capacity at the $3^{rd}$ cycle.)

As shown in FIG. 7, the lithium secondary battery manufactured according to Example 7 including a combination of the compounds according to embodiments of the present invention was found to have a significantly improved capacity retention rate after the battery remained at high temperature, compared to that of the lithium secondary battery of Comparative Example 6 including no additive.

Evaluation Example 6: High-Temperature Storage Direct Current Internal Resistance (DCIR) Evaluation At the $1^{st}$ cycle, the lithium secondary batteries manufactured according to each of Example 7 and Comparative Example 6 were charged with a constant current of 0.5 C until a voltage was 50% of state of charge (SOC), cut-off at 0.02 C and rested for 10 minutes, discharged with a constant current of 0.5 C for 30 seconds, rested for 30 seconds, charged with a constant current of 0.5 C for 30 seconds, rested for 10 minutes, discharged with a constant current of 1.0 C for 30 seconds, rested for 30 seconds, charged with a constant current of 0.5 C for 1 minute, rested for 10 minutes, discharged with a constant current of 2.0 C for 30 seconds, rested for 30 seconds, charged with a constant current of 0.5 C for 2 minutes, and rested for 10 minutes, to measure direct current internal resistances (DCIR) of the batteries, and the results are shown in FIG. 8.

Here, an average voltage decrease value for 10 seconds per C-rate is a direct current voltage value.

Figure 8:
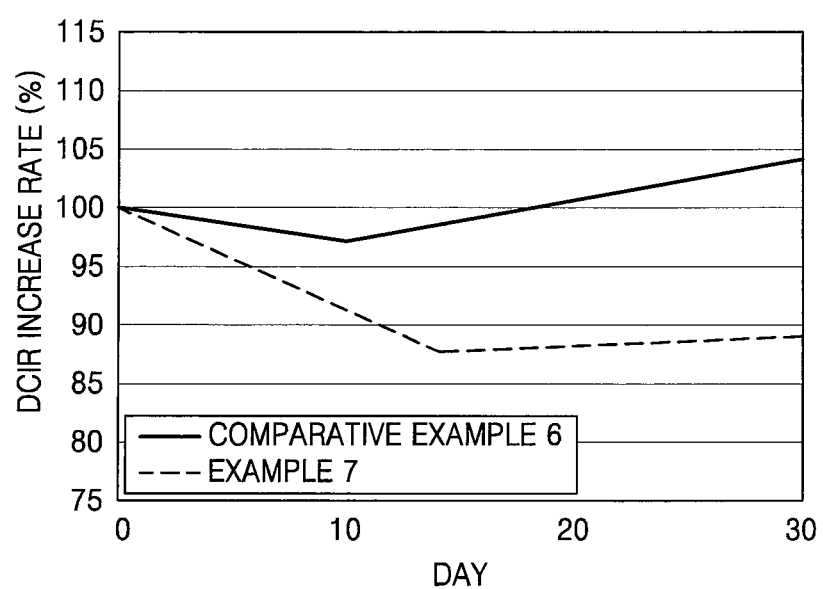
FIG. 8 is a graph showing increase rate of a direct current internal resistance (DCIR) of the lithium secondary batteries prepared according to Example 7 and Comparative Example 6, when the batteries remained at a temperature of 60° C.

As shown in FIG. 8, the lithium secondary battery of Example 7 including a combination of the compounds according to embodiments of the present invention had a significantly lower DCIR increase rate when the battery was left at a high temperature, as compared to that of the lithium secondary battery of Comparative Example 6 including no additive.

Evaluation Example 7: Positive Electrode Cyclic Voltagmetry (CV) Measurement

Figure 9:
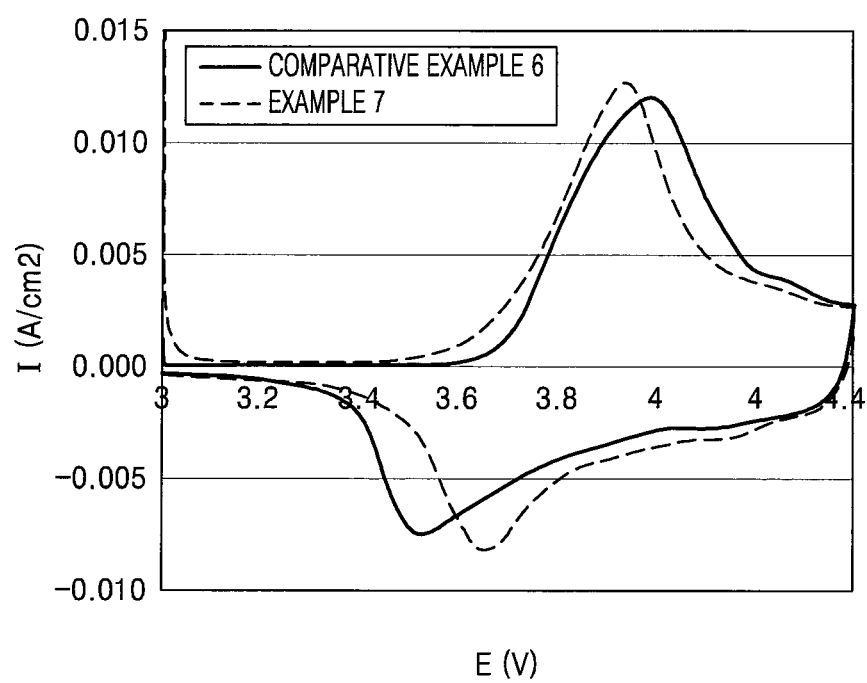
FIG. 9 is a graph showing positive electrode cyclic voltametry (CV) test results of the lithium batteries prepared according to Example 7 and Comparative Example 6.

Currents according to a voltage change within a voltage range of about 3.0 V to about 4.4 V at a scan rate of 0.2 mV/s were measured with respect to a positive electrode half cells and using lithium metal as a counter electrode, instead of the negative electrodes prepared according to Example 7 and Comparative Example 6, and the results are shown in FIG. 9.

As shown in FIG. 9, during charging, the battery of Example 7 including a combination of the compounds according to embodiments of the present invention started deintercalation of lithium ions at a voltage lower than that of the battery of Comparative Example 6, and thus the battery of Example 7 exhibited low resistance. Also, during discharging, the battery of Example 7 started intercalation of lithium ions at a voltage higher than that of the battery of Comparative Example 6, and thus the battery of Example 7 may have a high driving voltage. Moreover, during charging and discharging, the battery of Example 7 had a peak voltage that was higher than that of the battery of Comparative Example 6. Accordingly, output characteristics of a battery may improve when the battery includes a combination of the compounds according to embodiments of the present invention.

According to the one or more of the above-described embodiments of the present invention, when a lithium battery includes an electrolytic solution including a disultone-based compound and a non-polar unsaturated group-containing cyclic carbonate-based compound, lifespan characteristics of the lithium battery may improve.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and equivalents thereof.

What is claimed is:
1. An electrolytic solution for a lithium battery, the electrolytic solution comprising:
   a lithium salt;
   an organic solvent;
   a non-polar unsaturated group-containing cyclic carbonate-based compound; and
   a disultone-based compound represented by Formula 1:

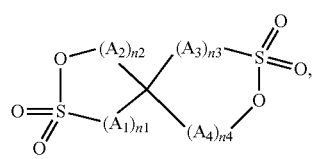

Formula 1 wherein, in Formula 1,
$A_1$ to $A_4$ are each independently selected from a substituted or unsubstituted $C_1$-$C_5$ alkylene group, a carbonyl group, and a sulfinyl group;

n1 to n4 are each independently an integer selected from 1 to 3; and when n1 to n4 are each independently two or greater, the respective plurality of any of $A_1$s to $A_4$s are identical to or different from each other.

2. The electrolytic solution of claim 1, wherein at least one of $A_1$ to $A_4$ is a substituted $C_1$-$C_5$ alkylene group, and the substituent is at least one selected from a deuterium atom, a halogen substituted or unsubstituted $C_1$-$C_{20}$ alkyl group, a halogen substituted or unsubstituted $C_5$-$C_{20}$ cycloalkyl group, a halogen substituted or unsubstituted $C_1$-$C_{20}$ alkoxy group, a halogen substituted or unsubstituted $C_2$-$C_{20}$ alkenyl group, a halogen substituted or unsubstituted $C_2$-$C_{20}$ alkynyl group, a halogen substituted or unsubstituted $C_3$-$C_{20}$ cycloalkenyl group, a halogen substituted or unsubstituted $C_3$-$C_{20}$ heterocycloalkyl group, a halogen substituted or unsubstituted $C_1$-$C_{20}$ heterocycloalkenyl group, a halogen substituted or unsubstituted $C_6$-$C_{40}$ aryl group, a halogen substituted or unsubstituted $C_3$-$C_{40}$ aryloxy group, a halogen substituted or unsubstituted $C_3$-$C_{40}$ arylthio group, a halogen substituted or unsubstituted $C_2$-$C_{40}$ heteroaryl group, and a polar functional group comprising a heteroatom in addition to any of the substituents above.

3. The electrolytic solution of claim 2, wherein the polar functional group comprising a heteroatom is selected from —F, —Cl, —Br, —I, a hydroxyl group, a cyano group, a thiocyano group, an isocyanato group, a nitro group, a nitroso group, an azide group, an amino group, an amidino group, a hydrazine group, a hydrazone group, —OC(=O)OR$^{16}$, —R$^{15}$OC(=O)OR$^{16}$, —C(=O)R$^{16}$, —R$^{15}$C(=O)R$^{16}$, —OC(=O)R$^{16}$, —R$^{15}$OC(=O)R$^{16}$, C(=O)—O—C(=O)R$^{16}$, —R$^{15}$C(=O)—O—C(=O)R$^{16}$, —SR$^{16}$, —R$^{15}$SR$^{16}$, —SSR$^{16}$, —R$^{15}$SSR$^{16}$, —S(=O)R$^{16}$, —R$^{15}$S(=O)R$^{16}$, —R$^{15}$C(=S)R$^{16}$, —R$^{15}$C(=S)SR$^{16}$, —NNC(=S)R$^{16}$, —R$^{15}$NNC(=S)R$^{16}$,

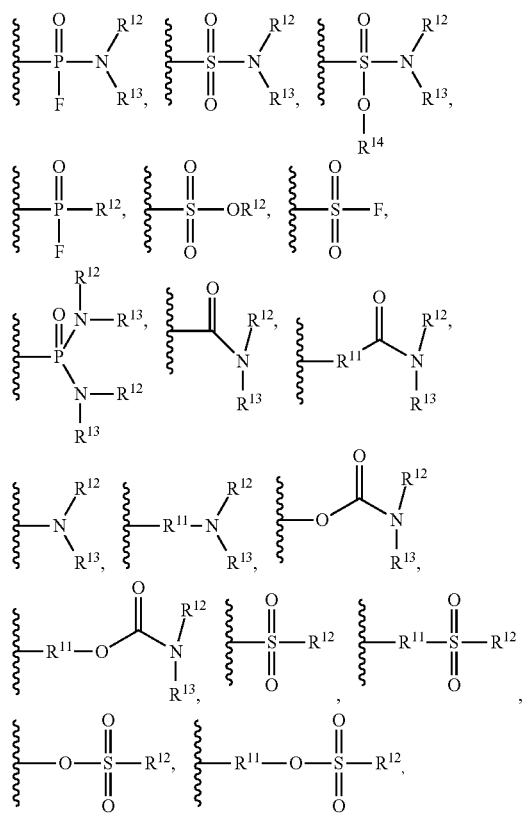

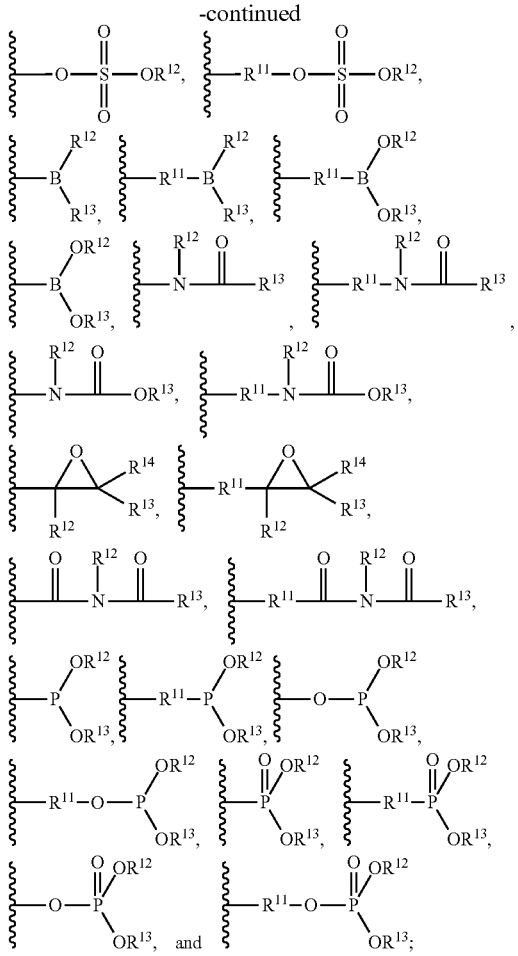

$R^{11}$ and $R^{15}$ are each independently selected from a halogen substituted or unsubstituted $C_1$-$C_{20}$ alkylene group, a halogen substituted or unsubstituted $C_2$-$C_{20}$ alkenylene group, a halogen substituted or unsubstituted $C_3$-$C_{20}$ cycloalkylene group, a halogen substituted or unsubstituted $C_3$-$C_{20}$ cycloalkenylene group, a halogen substituted or unsubstituted $C_1$-$C_{20}$ heterocycloalkenylene group, a halogen substituted or unsubstituted $C_6$-$C_{20}$ arylene group, and a halogen substituted or unsubstituted $C_1$-$C_{20}$ heteroarylene group; and $R^{12}$, $R^{13}$, $R^{14}$, and $R^{16}$ are each independently selected from a hydrogen atom, a halogen atom, a halogen substituted or unsubstituted $C_1$-$C_{20}$ alkyl group, a halogen substituted or unsubstituted $C_2$-$C_{20}$ alkenyl group, a halogen substituted or unsubstituted $C_2$-$C_{20}$ alkynyl group, a halogen substituted or unsubstituted $C_2$-$C_{20}$ alkoxy group, a halogen substituted or unsubstituted $C_3$-$C_{20}$ cycloalkyl group, a halogen substituted or unsubstituted $C_1$-$C_{20}$ heterocycloalkyl group, a halogen substituted or unsubstituted $C_3$-$C_{20}$ cycloalkenyl group, a halogen substituted or unsubstituted $C_1$-$C_{20}$ heterocycloalkenyl group, a halogen substituted or unsubstituted $C_6$-$C_{20}$ aryl group, a halogen substituted or unsubstituted $C_6$-$C_{20}$ aryloxy group, a halogen substituted or unsubstituted $C_5$-$C_{20}$ arylthio group, a halogen substituted or unsubstituted $C_2$-$C_{40}$ heteroaryl group, and a halogen substituted or unsubstituted $C_7$-$C_{15}$ trialkylsilyl group.

4. The electrolytic solution of claim 3, wherein the halogen atom is fluorine.

5. The electrolytic solution of claim 1, wherein at least one of $A_1$ to $A_4$ is a substituted $C_1$-$C_5$ alkylene group, and the substituent is at least one selected from a halogen atom, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrolyl group, and a pyridinyl group.

6. The electrolytic solution of claim 1, wherein $A_1$ to $A_4$ are each independently a $C_1$-$C_5$ alkylene group, n1 and n3 are each independently selected from 1 and 2, and n2 and n4 are each independently 1.

7. The electrolytic solution of claim 1, wherein the disultone-based compound is represented by at least one of Formulae 2 and 3:

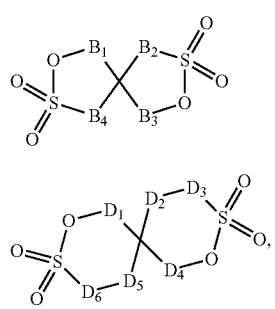

Formula 2

Formula 3 wherein, in Formulae 2 and 3,
$B_1$ to $B_4$ and $D_1$ to $D_6$ are each independently selected from —C($E_1$)($E_2$)-, a carbonyl group, and a sulfinyl group; and
$E_1$ and $E_2$ are each independently selected from a hydrogen atom, a halogen atom, a halogen substituted or unsubstituted $C_1$-$C_{20}$ alkyl group, a halogen substituted or unsubstituted $C_2$-$C_{20}$ alkenyl group, a halogen substituted or unsubstituted $C_2$-$C_{20}$ alkynyl group, a halogen substituted or unsubstituted $C_2$-$C_{20}$ alkoxy group, a halogen substituted or unsubstituted $C_3$-$C_{20}$ cycloalkyl group, a halogen substituted or unsubstituted $C_1$-$C_{20}$ heterocycloalkyl group, a halogen substituted or unsubstituted $C_3$-$C_{20}$ cycloalkenyl group, a halogen substituted or unsubstituted $C_1$-$C_{20}$ heterocycloalkenyl group, a halogen substituted or unsubstituted $C_6$-$C_{20}$ aryl group, a halogen substituted or unsubstituted $C_6$-$C_{20}$ aryloxy group, a halogen substituted or unsubstituted $C_5$-$C_{20}$ arylthio group, and a halogen substituted or unsubstituted $C_2$-$C_{40}$ heteroaryl group.

8. The electrolytic solution of claim 7, wherein $E_1$ and $E_2$ are each independently selected from a hydrogen atom, a halogen atom, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrolyl group, and a pyridinyl group.

9. The electrolytic solution of claim 7, wherein $E_1$ and $E_2$ are each independently selected from a hydrogen atom, a fluorine atom, a methyl group, an ethyl group, a trifluoromethyl group, a tetrafluoroethyl group, and a phenyl group.

10. The electrolytic solution of claim 1, wherein the disultone-based compound is represented by at least one of Formulae 4 and 5:

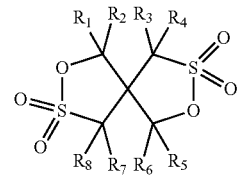

Formula 4

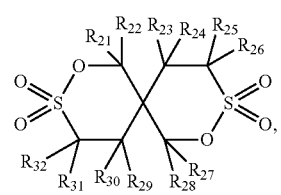

Formula 5 wherein, in Formulae 4 and 5,
$R_1$ to $R_8$ and $R_{21}$ to $R_{32}$ are each independently selected from a hydrogen atom, a halogen atom, a halogen substituted or unsubstituted $C_1$-$C_{10}$ alkyl group, a halogen substituted or unsubstituted $C_6$-$C_{20}$ aryl group, and a halogen substituted or unsubstituted $C_1$-$C_{20}$ heteroaryl group.

11. The electrolytic solution of claim 10, wherein $R_1$ to $R_8$ and $R_{21}$ to $R_{32}$ are each independently selected from a hydrogen atom, a halogen atom, a methyl group, an ethyl group, a propyl group, an isopropyl group, a butyl group, a tert-butyl group, a trifluoromethyl group, a tetrafluoroethyl group, a phenyl group, a naphthyl group, a tetrafluorophenyl group, a pyrrolyl group, and a pyridinyl group.

12. The electrolytic solution of claim 10, wherein $R_1$ to $R_8$ and $R_{21}$ to $R_{32}$ are each independently selected from a hydrogen atom, a fluorine atom, a methyl group, an ethyl group, a propyl group, a trifluoromethyl group, a tetrafluoroethyl group, and a phenyl group.

13. The electrolytic solution of claim 1, wherein the disultone-based compound is represented by at least one of Formulae 6 to 17:

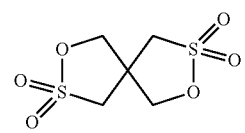

Formula 6

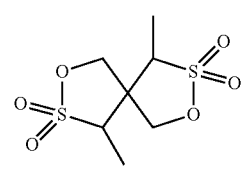

Formula 7

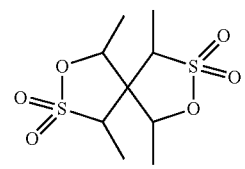

Formula 8

-continued

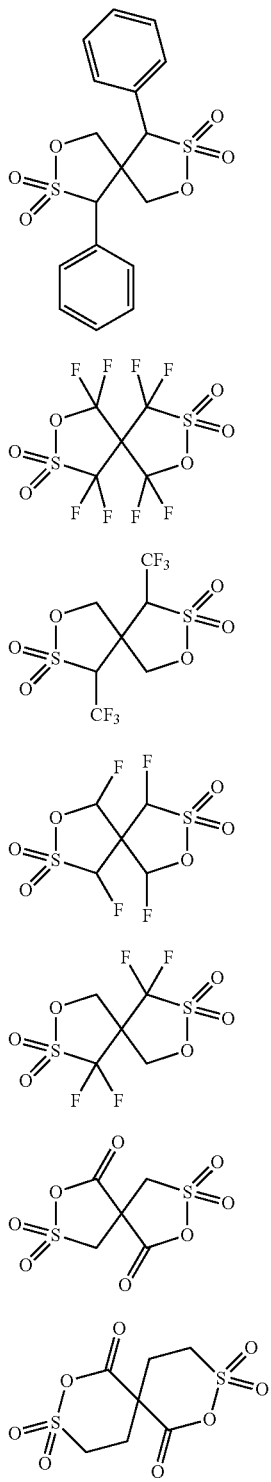

Formula 9

Formula 10

Formula 11

Formula 12

Formula 13

Formula 14

Formula 15

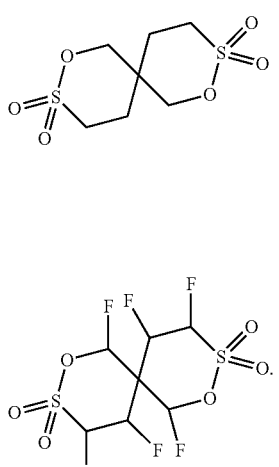

Formula 16

Formula 17

14. The electrolytic solution of claim 1, wherein the non-polar unsaturated group-containing cyclic carbonate-based compound comprises a vinyl group, a vinylene group, or a non-polar unsaturated group of a combination thereof.

15. The electrolytic solution of claim 1, wherein the non-polar unsaturated group-containing cyclic carbonate-based compound is at least one selected from vinylene carbonate; a vinylene carbonate derivative having at least one substituent selected from a halogen atom, a cyano group (CN), and a nitro group ($NO_2$); vinylethylene carbonate; and a vinylethylene carbonate derivative having at least one substituent selected from a halogen atom, a cyano group (CN), and a nitro group ($NO_2$).

16. The electrolytic solution of claim 1, wherein the non-polar unsaturated group-containing cyclic carbonate-based compound is at least one selected from vinylene carbonate and vinylethylene carbonate.

17. The electrolytic solution of claim 1, wherein an amount of the disultone-based compound and an amount of the non-polar unsaturated group-containing cyclic carbonate-based compound are each independently in a range of about 0.1 wt % to about 10 wt % based on the total weight of the electrolytic solution.

18. A lithium battery comprising:
a positive electrode;
a negative electrode; and
the electrolytic solution of claim 1.

19. The lithium battery of claim 18, wherein the negative electrode comprises graphite.

20. The lithium battery of claim 18, wherein the lithium battery has a driving voltage of 3.8 V or greater.

* * * * *